United States Patent [19]
Bienvenu et al.

[11] 4,060,849

[45] Nov. 29, 1977

[54] DATA INPUT AND OUTPUT CONTROLLER

[75] Inventors: Jacques Michel Jean Bienvenu, Paris; Jean-Claude Marcel Cassonnet, Conflans-Ste-Honorine; Marc Michel Appell, Paris, all of France

[73] Assignee: Compagnie Internationale pour l'Informatique Cii-Honeywell Bull, Paris, France

[21] Appl. No.: 626,220

[22] Filed: Oct. 28, 1975

[51] Int. Cl.² .............................................. G06F 3/00
[52] U.S. Cl. .................................................. 364/200
[58] Field of Search .......................... 340/172.5; 444/1

[56] References Cited

U.S. PATENT DOCUMENTS

| | | | |
|---|---|---|---|
| 3,725,864 | 4/1973 | Clark et al. | 340/172.5 |
| 3,848,233 | 11/1974 | Lotan et al. | 340/172.5 |

OTHER PUBLICATIONS

Grant et al., "Priority Interrupt Queuing," *IBM T.D.B.*, vol. 15, No. 10, Mar. 1973, pp. 3046–3048.
Iskiyan et al., "Microprogram Arrangements," *IBM T.D.B.*, vol. 13, No. 8, Jan. 1971, pp. 2363–2365.
Edel, "Intelligent Input/Output Interrupt Processing," *IBM T.D.B.*, vol. 17, No. 7, Dec. 1974, pp. 1915–1916.

*Primary Examiner*—Raulfe B. Zache
*Attorney, Agent, or Firm*—Cameron, Kerkam, Sutton, Stowell & Stowell

[57] ABSTRACT

There is disclosed an input/output controller for an information processing system comprising a main memory, a central processing unit, a peripheral controller and a plurality of peripheral units coupled to the central processing unit. In particular, the input/output controller comprises a plurality of physical channels disposed between the peripheral controller and the central processing unit, a plurality of logical channels for transmitting information with the central processing unit, and each uniquely associated with one of the peripheral units. The main memory stores a first table including a physical channel entry containing informaton relative to the plurality of physical channels and a second table including a logical channel entry containing information relative to the plurality of peripheral units. Further, there is included means for storing a channel control program to be executed by the input/output control system for selectively transferring data between the main memory and the peripheral controller by first connecting the input/output control system to a logical channel entry and placing the identified logical channel table into the means for storing for a subsequent execution.

7 Claims, 22 Drawing Figures

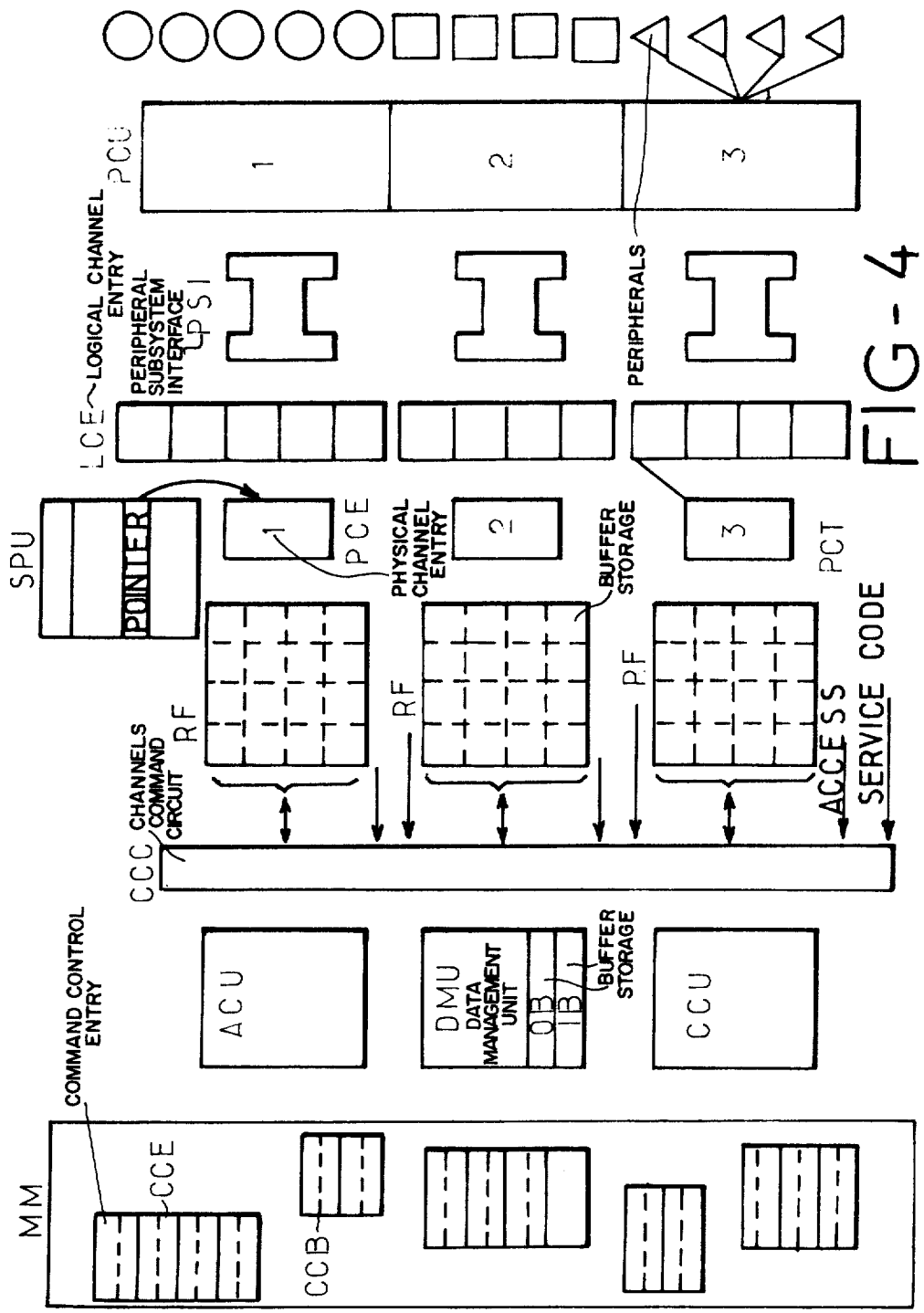

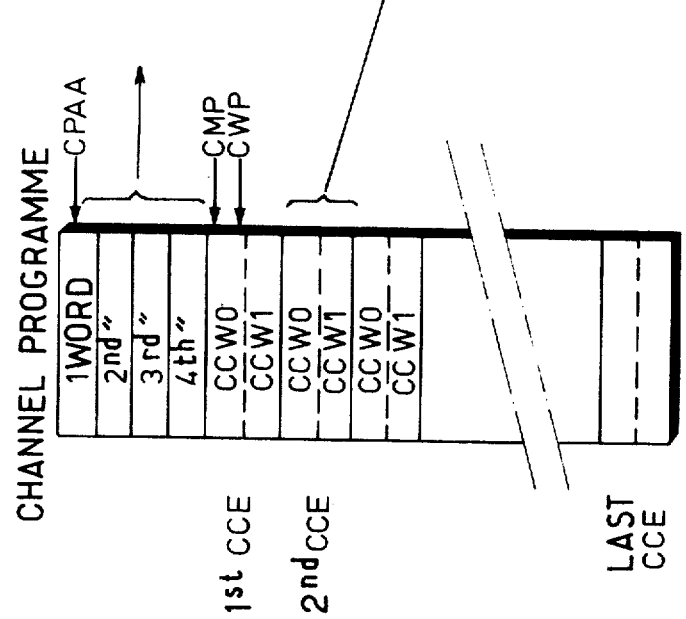

|  0 | 8 | | | 31 | |
|---|---|---|---|---|---|
| CPC | 0000 | CPAA | | 0 0 0 | 0 |
| LC STATUS | | Ga Da | | | 1 |
| Link Q/LC/INW | | Initiation queue link Q/LC/PC | | | 2 |
| MBZ | | CMP | | 000 | 3 |
| IOC Status | PC Status | Circuit Status | | Emulated code | 4 |
| MBZ | Flags | MBZ | Data count | | 5 |
| MBZ | | ACWP | | 00 | 6 |
| MBZ | Flags | MBZ | Data address / Detailed status count | | 7 |
| Q/LC/EVQ or Q/LC/FLS | Or Link | Type of Event | MPL | 1000 | 8 |
| PC | LC | Residue count | | | 9 |
| MBZ | | Correct CCE adresse | | | 10 |
| IOC Status | | Peripheral Status | | | 11 |
| Q/LC/EVQ or Q/LC/FLS link | | 1000 1101 | 1111 | 1000 | 12 |
| PC | LC | Name of member affected | | | 13 |
| MBZ | | Gi Di | | | 14 |
| IOC Status | | Peripheral status | | | 15 |

FIG-18

DATA INPUT AND OUTPUT CONTROLLER

The object of the present invention is a data input and output controller intended to manage transfers of information between the main or central memory and the peripheral devices belonging to the peripheral sub-system. In an information system the processing of data necessitates constant and simultaneous dialogue between what will be called resources, consisting essentially of peripheral elements of high capacity, the central memory and the central processor which actually initiates various calculations on the data introduced.

When a central unit is connected to a large number of peripherals the practice is known of regrouping these as a function of their characteristics and connecting them to peripheral controllers which will hereinafter be designated by the initials PCU coming from the English expression "peripheral controller unit". The present invention refers more precisely to means of control of transfers of information between the central unit and the peripheral controllers. In a system of this type the fundamental problem springs from the difference in speed between on the one hand the development of instructions inside the computer (a speed which may be of the order of 1 million operators per second) and on the other hand the transfer rates which are in general much slower, being imposed by the peripherals (ten characters per second in the case of a machine of TELEX species, sixty for a tape perforator, two hundred thousand for a magnetic tape). In prior techniques this problem was resolved by locking the central unit onto an input/output operation until it was finished. The increase in processing power of computers has quickly made a solution of this type impossible, the time occupied by data inputs and outputs costing far too much for units of this type. One has therefore been led to look for means enabling a processing program and input and output operations to be carried out simultaneously. Various solutions have already been proposed and especially a method known as "programme interruption". In this method the central unit is relieved of the periodical supervision of the peripherals which are able to interrupt it in order to signal to it that they are ready to carry out a certain job.

The interruption consists in stopping momentarily the programme under way in order to enable the program effecting the transfer to execute it as priority. Of course the processing program is delayed by this interruption but the data transfers when they have been prepared by the peripheral controller only require a time which is short in comparison with the processing proper.

The transfer of one word implies in the interruption method the development of a program which lasts 10 to 20 memory cycles, only one of which is actually made use of. One has therefore been led to employ automatic exchange units or channels capable of taking over the transfer of a block of data. The exchange unit therefore emits a service order so that one memory cycle is allotted to it in order to effect this exchange.

Development of an operation is as follows:
 initialization of the transfer by the programme;
 transfer at a tempo determined by the peripheral;
 end of transfer.

In this method the central processor or unit must initialize each transfer. It has already been proposed in order to relieve the central unit, to effect chaining of the data and functions, the input/output controller or exchange unit having its own program. Chaining of the data is a notion distinct from chaining of the functions. Actually chaining of the data enables passing automatically from one table to another when transfer of data from the first one is finished. Chaining of the functions for its part enables a number of transfers to be caused to be performed in succession, bringing into play various recordings on one and the same peripheral member.

The present invention refers to a device of the species described above in which the input/output controller (which will be called below IOC, being the initials of "Input Output Controller", an expression of Anglosaxon origin established by usage) is a unit capable of reading, decoding and performing an input/output order programme or a channel programme contained in the main memory.

The jobs assigned to the IOC controller are the following:
 command of the central interface
 command of access to and reading from the central memory
 command of the execution of the program
 feeding in of the program
 control of access
 execution of certain instructions locally
 catenation of the sequences on the local program The IOC controller is generally shared out between a number of channels and can execute about 100 channel programs simultaneously.

In order to do a job a process may need information stored in a peripheral device such as a card-reader, for example. The results of this operation may have to be sent in the direction of another peripheral such as a printer, for example. These operations are controlled by special instructions called "channel commands" sent to the peripheral by the input output controller. Channel programme will be the name given to the whole of the channel commands employed in one input/output operation. In order to obtain better organisation of the exchanges of information a peripheral control unit PCU which may be either a recording and control unit URC or a unit for control of bulk storage MSC, being devices which will be designated below as units for controlling a peripheral sub-system, PCU, is interposed between the IOC and the peripherals.

Thus the aim of the IOC is to control the input/output operations or I/O operations between the main memory and the PCU. In order to get the idea, 6 PCU might, for example, be connected to one IOC controller.

The interface between the PCU and the IOC is called the peripheral sub-system interface or PSI. By convention, transfers between the main memory and the PCU will be called "input" or "read" transfers when it is a question of transfer from the PCU towards the main memory MM and "output" or "write" transfers when it is a question of transfer from the main memory MM towards the PCU.

When a process needs to employ a peripheral in order to effect a transfer it "wakes up" the associated channel programme by a special instruction sent to the central processor.

In this case the IOC sends the PCU associated with the peripheral which is to be connected up a special signal through the PSI in order to indicate that a channel programme is awaiting its execution.

In accordance with the invention the input output controller for an information system comprising a main memory, a central processor and peripheral units connected to the central processor by means of at least one peripheral controller acting upon the said peripheral devices, the input/output operations being executed under the control of channel programs, is characterized in that it comprises physical connection channels between a peripheral controller and an input to the central processor, and logical channels for communication with the central unit, one logical channel being relative to one peripheral unit and to one only, referenced by a channel number, information relative to the physical channels and the logical channels being gathered together in tables in the main memory, the table of physical channels consisting of a number of physical-channel entries whilst with each entry of the physical channel there corresponds a logical channel table composed of logic channel entries and pointers enabling access to the said information.

The input/output controller in accordance with the invention enables the material resources of the system to be employed in optimum manner, by requiring only the time necessary to the data transfers.

In accordance with another characteristic of the invention the central processor and the peripheral controller have the possibility of transmitting messages of notification of emergencies to the input/output controller if synchronous or asynchronous emergencies are produced during the execution of a channel program.

The utilization programs must be able to communicate with the peripherals for transfer of data and programs. In this case certain resources of the processor CPU are dedicated to the input output controller IOC. Requests for utilization programmes are effected by means of a macro-call-in which generates a programme for command of the input and output channels. These channel programs consist of a succession of channel command entries CCE. A channel command entry is composed of two words from the main memory containing command and address information, as will be described later.

The IOC executes certain instructions by means of the central processor CPU and transmits the others to the peripheral controllers PCU for execution. In order to increase the possibilities of processing multiple inputs, and outputs each channel programme is connected to a logical channel which is multiplexed with other logical channels onto one physical channel. The utilization programs communicate with the channel programmes by means of semaphores which will be described later and which are structures enabling the instruction and the data to be synchronized. The channel programs enable chaining of the data, chaining of the commands and transmissions of intermediate or end states. What is called "state" is a series of items of information relative to a particular peripheral which enables the central processor to know the state of the peripheral at a certain instant and to take appropriate measures. In a system employing the present invention the input/output controller is microprogramed. That is to say, a command memory contains programs internal to the machine and consisting of fixed sequences of microinstructions the execution of which catenates the various elementary functions, the sum of which represents a function of the machine in question. In the latter, if each function is commanded by an instruction and each type of instruction corresponds with a microprogram formed of the sequence of microinstructions required by the instruction (transfer from register to register, selection of memory and reading writing, advancing of the counter, device operational command, etc...).

Each microprogram corresponds with the execution of an instruction which is defined in the "internal decoration" or the operation specifications unit of a system.

Processing of the code of an internal decoration instruction calls for the microprogram lodged in a permanent manner in the control memory CSU. The control or command memory consists essentially of a dead memory ROS incorporated in the central processor CPU, with a possibility of extension into a zone reserved in the main memory.

The microprogram executes the instructions from the internal decoration on the operands defined by the code of instruction OPC0. All the standard microprograms are stored in the dead memory portion of the control memory. This control memory CSU is divided into segments. The microprograms corresponding with one unit of instructions from the internal decoration are located in one segment. Branching facilities are provided inside the control memory unit CSU enabling multiple selection and repeated use of common sub-microroutines. The microprogrammes execute the whole of the management of the central processor by the creation of blocks of firmware having specific functions. These blocks of firmware communicate with the system of exploitation but are not directly controlled by instructions from the internal decoration.

The microprograms of the input-output controller IOC execute the operations defined in the internal decoration and in the operational specifications of the peripheral sub-system interface PSI. In accordance with the invention, the peripheral devices are visible for the program through a logical entity resting on hardware and called the logical channel program (which consists of a sequence of input and output commands) and states of execution of which the central processor is able to have knowledge thanks to the semaphores.

By way of example the microprograms IOC can occupy a zone of 5000 octets in the command or control memory and a zone of 1500 octets in the central memory.

Two hundred and fifty six logical channels can theoretically execute channel programs on one single physical channel. The practical limitation depends on the possibilities of the channel and the peripheral controller. The execution of a channel programme by a logical channel must be considered on the plane of concepts as a pseudo-process of input and output being executed simultaneously with other I/O processes and processes of the central processor. Thus theoretically the number of input and output processes with 12 physical channels is 12 × 256. The PCU commands the execution of the channel program by means of a special command addressed to the IOC and called the service code.

When an emergency supervenes or if execution of the channel program is finished in the PCU an emergency message is sent by the PCU to the IOC. An emergency message contains a service code and a state considered as an item of data. There exists, therefore, between the IOC and the PCU a transfer of service codes and a transfer of data. The hardware and firmware elements of the IOC are worked out with the aim of commanding these transfers.

Other characteristics and advantages of the invention will become apparent in the course of the description which follows of a particular embodiment in relation to the Figures:

FIG. 4 is an exploded view of the input/output controller of an information system.

FIG. 5 is the diagram of a channel program.

FIG. 6 is a diagram of the form and size of the head of a channel program.

FIG. 7 represents the structure of a channel command entry CCE.

FIG. 8 represents a channel command entry CCE for a transfer of data.

FIG. 14a is an address diagram of the logical channel tables LCT.

FIG. 18 represents a logical channel entry LCE.

Figure 1:
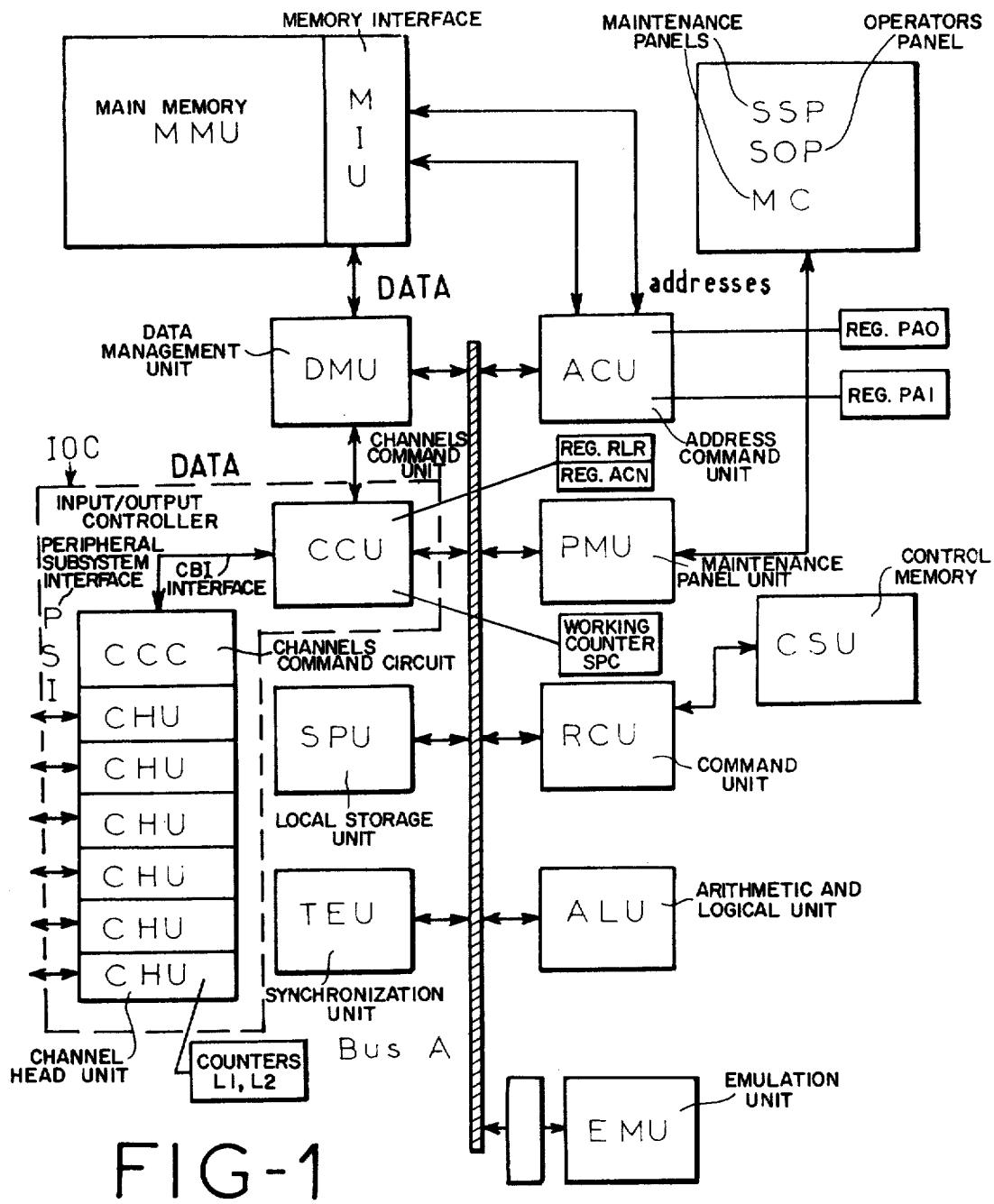
FIG. 1 is a diagram of the central processor of an information system and of the main memory.

With each PCU is associated a channel command unit or channel head CHU which appears in FIG. 1, each channel head comprising:

a service code register SCR which memorizes the current service code;

a classification register of 16 octets which memorizes temporarily the data transferred between the main memory and the PCU;

a counter L1 which indicates the number of octets remaining to be transferred between the PCU and the classification register or buffer storage RF;

a difference pointer DP which memorizes the number of octets stored in the RF at a given instant.

The channel head CHU is described in more detailed fashion in French Application No. 74.03489, filed simultaneously with the present Application, for: "A device for regulation of data transfer rate", by the Applicant.

The IOC is composed in addition of various elements.

The channel command unit CCU comprises a working counter SPC which indicates the number of octets remaining to be transferred between the main memory and the buffer storage RF of each CHU. The data management unit DMU contains:

a. a buffer storage OB of 4 octets which memorizes temporarily the data read out of the main memory MM before they are introduced into the register storage RF;

b. a buffer storage IB which fills the same role before the data are introduced into the central memory.

The PCU commands the execution of the channel programmes and manages the use of the physical channels. The central processor CPU is thus relieved of the job of permanent supervision of the peripherals. It intervenes in the input and output operations only as a result of signals which are transmitted to it by the PCU when there is actually something to be transmitted. This management is obtained by a dialogue across the interface PSI which consists of data transfer sequences and service code sequences.

The service code sequences are used to perform the following operations:

Commencement of the execution of a new channel programme and commencement of the transfer of the first channel command entry CCE of the channel programme;

Displacement of the channel pointers in the channel programme and initialization of the transfer of the next CCE;

Transfer of the detailed state octets or initialization of the transfer of the state octets during the execution of a channel programmes or at the end of the execution of it.

The service code sequences may initialize transfers of octets between the PCU and the IOC.

These transfers will below be called data transfer sequences but these octets may be:

Data octets relating to a data transfer CCE;

Command octets sent by the IOC (octets of the next entry CCE to be executed);

Instructions by the IOC when it wishes to inform the PCU of certain emergencies;

Detailed state octets sent by the PCU during the execution of a channel programme.

The microprogrammes of the IOC command and manage all the operations required by the service code sequences and if necessary initialize the subsequent octet transfers. Depending upon the type of sequence there may be sent by the PCU up to five octets: service code octet, logical channel number, branching argument, or one of the three summarized-state octets from the peripheral (PSB). The first two octets of a service code sequence are received in a channel head CHU by the hardware, but the reception if necessary of the last three octets if taken care of by the firmware.

During a service code sequence the firmware IOC may be called to the reception of the last octet sent by the PCU and during a sequence greater than two octets when the CHU has received the first two octets.

Every transfer sequence of data (data proper, state or command octet) is got under way by the firmware IOC during the previous service code sequence and is executed as a transfer of chained data.

A transfer of chained data is a transfer of blocks of data between the PCU and a group of non-contiguous memory zones. Such transfer is controlled by a group of CCE gathered into a table of chained data DCA. The length of the table DCA is indicated by the contents of the first entry CCE and subsequent CCE with the exception of the last. For this purpose a chaining flag or indicator is brought to 1 in every CCE except the last.

If in a channel input the chaining indicator is brought to 1, indicating that there is chaining, the transfer will not end when the "count" is at zero. A new "count" and a new central memory address will be taken off from the next CCE in the table DCA by the IOC and transfer will continue to the new address. The transfer ends when the count of a CCE the chaining indicator of which is at zero is at zero or upon the sending by the PCU of a signal TMI.

The address command unit ACU contains a working storage for the addresses PA which contains two registers PA0 and PA1 respectively associated with each PCU.

Different levels of priority are allotted to each PCU for the execution of the channel programmes. In an information system in which the invention is set to work there exist four levels of priority. Level 0 corresponds with a transfer of data with high priority. Level 1 is a transfer of services codes with high priority. Level 2 is a transfer of data with low priority and level 3 is a transfer of service codes with low priority. Operations of the command system of the central processor are executed at level 4, that is to say, operations of the inputs and outputs controller IOC have priority over computing operations by the central processor.

The IOC can multiplex the channel programmes relative to different PCU and contains a hardware network for priority, enabling it to be defined which PCU is to be connected at a given moment.

A channel programme in the course of execution will be interrupted if the level of priority of another channel programme is higher. Similarly an instruction from the central processor or an operation of the system controller which are at priority level 4 are interrupted by the IOC upon the request of the PCU by the execution of a channel programme.

Channel program

An input-output operation which must be executed by the IOC and the PCU will be called a channel programme. A channel program is a true programme, that is to say, it is a sequence of programme signals with the faculty of branching, that is to say, of access to any address whatever. Every logical channel is capable of executing a channel programme. Usually the execution of a channel programme requires of the software only a single starting signal (CONNECT) and the reception of a message by means of a semaphore at the end of the execution. There exists complete simultaneity between the execution of programmes by the central processor (or processes) and the execution of channel programmes over the logic channels. Thus the execution of a channel programme is a peripheral process.

A channel programme is composed of a channel programme start and channel command entries CCE. A CCE extends over a width of two words CCW0 and CCW1 and contains a command octet defining the operations to be carried out, an indicator or flag octet specifying the conditions of execution such as: chaining of commands, chaining of data, interruptions, etc..., a count over two octets and the absolute address of the data transfer over a length of four octets. The count and the address field may also be replaced by a command extension.

There is a special indicator which indicates that another command is following the present comment which is in course of execution. It is a matter of the chaining or catenation indicator. When this indicator is at zero the processor knows that the instruction under consideration is the last one in the channel programme. Another flag or indicator called the data chaining flag indicates that the data transfer defined by the address and the count of the channel entry CCE is not finished and that transfer is going to continue with the count and the address entered in the next CCE. Thus a table of channel command entries defines the whole of the commands in this case. The data transfer takes place in non-consecutive zones defined by the successive command entries CCE of the table. The last channel command entry CCE is referenced by the fact that the indicator is equal to zero. The peripheral controller PCU is not informed that there is chaining of data and hence does not intervene in the dialogue exchanged through the PSI. The normal data transfer rate must be maintained over the PSI even when there is chaining of data. The channel programmes comprise a programme head which contains the number of the channel to which the programme is allocated, the logic name $G_iD_i$ of the semaphore employed for calling for the interruption manipulator process in the event of notification of intermediate or final emergency. The programme head likewise contains the size and locality of a memory zone reserved for the detailed status sent by the peripherals controller PCU.

By the execution of an instruction CONNECT, the peripheral sub-system commences the transmission operations by addressing a signal CPW signifying that a channel programme is waiting.

In accordance with a characteristic of the inputs and outputs controller of the invention, it is the PCU, the peripheral controller, which commands the execution of the channel programmes. The PCU starts the channel programme by asking the IOC, the input and output controller, to send the first channel command entry CCE and then it proceeds to its execution.

The controller IOC has two channel programmes pointers, the command pointer CMP and the command word pointer CWP.

These pointers are displaced at the request of the peripheral controller PCU and by this displacement the PCU's can execute or reject a programme or pass from one programme to another. If the command brings about a data transfer the IOC keeps the count and the address in the CCE. When a peripheral operation has ended the PCU sends an "end" message and the IOC places this message in a notification queue.

The peripheral controller controls on the one hand the development of the channel programme and on the other hand the use of the physical channel and the resources by multiplexing the channel programmes.

There are eight software instructions IOC which are all privileged. Their roles can be summarized as follows:

a. CONNECT — This instruction selects a channel programme, that is to say, it checks whether this channel is in a state of activity or not. If it is not in activity it is placed in a start queue. This queue is in communication with a physical channel. When there is at least one entry in the queue a special line of the peripherals sub-system interface is brought to the state 1 as will be described below in order to forewarn the PCU that at least one channel programme is awaiting its execution.

When the PCU asks for an initialization the logical channel is extracted from the queue and the logical channel number and the first channel command entry are sent. If the queue becomes empty the line of the PSI mentioned previously drops back again to zero.

b. DISCONNECT — This instruction informs the PCU that it must terminate the channel programme of the corresponding logical channel. If the channel is still in a start queue the IOC will terminate it (before it has even commenced).

c. OTHER INSTRUCTIONS

The five other instructions: RESUME, FETCH LOGICAL CHANNEL FLCH, LOAD LOGICAL CHANNEL LLCH, RESET PHYSICAL CHANNEL RSPC, SET OPERATIONAL OUT (SOPO) and DIAGNOSE CHANNEL are employed under special circumstances.

A special group of microinstructions enables the service codes of high and low priorities to be analysed and the data transfers between the PCU's and the classification register RF to be initialized in the channel head CHU. It likewise enables transfer of data between the main memory and the register RF to be commanded in high and low priorities. The microinstructions of the IOC are divided into four blocks numbered from 0 to 3 corresponding with the different levels of priority in the execution of the channel programmes.

A physical channel is the physical tie between the IOC and the PCU; this physical tie consists of an interface PSI and means located on opposite sides of the interface the aim of which is to command this interface. A PCU can initialize any number whatever of channel programmes and multiplex the use of the physical channels.

A logical channel is for the programmer one logical entity enabling one input-output operation to be executed. When a channel programme is under execution a logical channel is associated with it. The associated logical channel is activated when the channel of the programme is under execution, and the physical channel is employed on shared time. A logical channel often corresponds with a single peripheral. However, when a number of functions of a peripheral must be ensured simultaneously, a number of logical channels may correspond with a single peripheral. That is, for example, the case in a printer in which one must ensure simultaneously the printing of the characters and the displacement of the paper. From the point of view of the programmer the input operations achieved over different logical channels are completely simultaneous and asynchronous.

The peripherals controller shares out the time of employment of the physical channels with a view of executing simultaneously a number of input output operations. The degree of simultaneity depends on the conception of the PCU employed, but the controller IOC can accept all the degrees of simultaneity which are asked for by the PCU insofar as it is not overloaded.

A logical channel is referenced by a channel number. This channel number is composed as follows:
- an IOC number always equal to zero (IOC#)
- a physical channel number lying between 0 and 6 (PC #)
- a logical channel number lying between 0 and 255 (LC #)

The form and size is the following:

| IOC# | PC# | LC# |
|---|---|---|
| 0    23 | 72 | 15 |

The information relative to each of the physical and logical channels is kept in tables. The physical channels table PCT gathers together the information relative to the physical channels in segments called physical channel entries PCE.

Thus there may be 6 PCE in the table PCT. The physical channel entries occupy 16 words numbered form 0 to F on the hexadecimal system.

With each entry PCE corresponds a logical channels table in which is gathered together the information relative to the associated logical channels which can be to the number of 256. Each logical channels table LCT will therefore comprise 256 logical channel entries LCE. A logical channel entry LCE always occupies 16 words numbered from 1 to F.

Pointers PCT and LCT enable the necessary information to be extracted from each table. The pointer PCT contains the absolute address of the commencement of the physical channels table PCT and the number of the physical channels entry PCE. Its form and size is the following:

| PCE# | Absolute Address PCT |
|---|---|
| 0    72 | 31 |

The pointer PCT is contained in the main memory above the address BAR and in the working storage SPU.

The pointer of the logical channels table LCT contains the absolute address of the logical table and the entry number into this table. Its form and size is the following:

| LC# | LCT Absolute Address |
|---|---|
| 0    78 | 31 |

Each table pointer LCT is contained in one word of the physical channel entry PCE.

A physical channel entry PCE is reached by use of the table PCT and the channel number PC#.

A logical channel entry LCE is reached by using the pointer PCT, the physical channel number PC#, the pointer LCT and the logical channel number LC#.

The IOC has special instructions for the input and output operations, called channel commands. A channel programme is a group of channel commands and items of address information enabling a sequence I/O to be started and executed.

A channel programme contains the number of the logical channel over which the transfers are effected.

A logical channel may be employed by different channel programmes. The channel programmes may also be executed simultaneously over different physical channels. The IOC manages this simultaneity.

The channel programmes employing a certain physical channel may also be executed simultaneously except if they are associated with the same physical channel. The central processor manages this simultaneity. The channel programmes are memorized in the central memory under BAR.

Channel programme structures

There are in a channel programme, as shown in FIG. 5:

A channel programme head composed of 4 words. The absolute address of the first word of the channel head is called the channel programme absolute address CPAA. It is stored in one word of the corresponding logical channel entry.

A command channel entry CCE of two words called respectively the channel command works 0 (CCW0) and 1 (CCW1).

The 4 words of the channel command head conain:
The number of the channel associated with the channel programme.
The level of priority of the channel programme by comparison with other channel programmes.
The name GD of the semaphore over which are directed the messages produced during the execution of the channel programme.
Information about the zone of the main memory in which may be stored the weak state of a peripheral.

The command channel entry enables a simple operation on a peripheral. The two words contain a channel command, flags and an item of address information.

The input/output controller will be defined as the whole of the elements which participate in input and output operations. In the information systems to which the invention is applied the input and output controller shares certain resources with the central processor and can interrupt the execution of the microprogrammes of the central processor at no matter what instant in order to execute its own microprogrammes.

The main resources shared with the central processor are: the command memory CSU, the central memory interface MIU and some logical units which are:
The ALU arithmetical and logical unit which executes the operations on words of 4 octets,
The data management unit, DMU, which manages the transfers of data into the main memory MMU,
The address command unit ACU which carried out the operations of incrementation and decrementation of the absolute addresses,
The command unit RCU of the command memory CSU which manages the transfers PCUCSU and contains various command or test registers.

The IOC has resources of its own which are located in the central processor CPU without for all that belonging to it. It is a question of:
in the local storage unit SPU, 33 memory positions each of 4 ocetets, employed as working zones or zones for putting in reserve;
in the data management unit, two registers of one word of 32 bits (4 octets) for transfer of data between the channel head CHU and the main memory:
in the address calculating unit ACU, thirtytwo address positions reserved to the IOC (two addresses per logical channel;
in the command unit of the specialized dead memory RCU, circuits intended to manage and execute the microprogramme interruptions for the IOC.

With each physical channel is associated a logical channels table LCT. Besides the circuits shared with the central processor the IOC employs circuits of its own which are:
a channel head CHU for each PSI,
a channels command circuit CCC common to six CHU,
a channels command unit CCU.

CHANNEL HEAD

An internal common interface CBI is defined. The CBI constitutes the interface between the CCC and the CCU. The functions of the channel head CHU are the following:
buffer-storing data in a 16-position register without intervention by the microprogrammes.
transfer of data with data-chaining.
During the execution of a sequence by the central processor CPU which gives an address and a count for the next data transfer to be carried out, the main memory cycles are not executed.

The configuration is formed of different channels which all have the same speed. The channels of which the priority is the lowest must wait during the memory cycles executed for the count of the other channels.
buffer-storing other parameters concerning the job in the course of execution, such as:
the level of priority,
the service code,
the residual width of the block of data on the PSI,
the mistakes.
synchronization of the dialogue PSI with the elements of the central processor CPU.
generation of requests for interruption for the processing circuits, for example, every time that 4 octets are ready to be transferred into the main memory, when the transfer is an input;
execution of functions commanded by microprogrammes for the execution of service codes transmitted by special command lines over a course of two octets.

CHANNELS COMMAND CIRCUIT

The circuit CCC fulfils the following functions:
selection of high-priority commands proceeding from the channel heads CHU (priority network);
commutation of the data from the CHU's and towards the CHU's;
memorizing connection information for the CHU's.

The priority network receives the request generated by each CHU (these requests being brought to light at each memory cycle). It gives the following information:
level of the highest priority (between 0 and 3, 0 being the highest level of priority);
number of the channel of highest priority amongst those which are applicants at this level (priority between the channels decreases from 0 to 11).

This information is sent to the channel command unit CCU.

CHANNEL COMMAND UNIT

The channel command unit CCU has the following functions:
selection of the highest level of priority amongst the requests from possible 2 CCC and transmission to the RCU (specialized storage command);
interface with the BUS A (for the data and the service code);
bringing to light and memorizing of the octets to be transmitted;
synchronization of the hardware and the firmware;
interface with the channel circuits (the CCU is capable of applying various definitions across the interface CBP);

alignment of the data octets and if necessary of the marks.

The priority network of the CCU:

It has two functions similar to those achieved in the common channels circuit CCU.

Thus there is obtained:
the higher level of priority between two CCC;
the number of channels of higher priority if the two CCC request operations at the same time at an equal level of priority (the highest priority given to the CCC, number 0, corresponds with the CHU's numbers 0 to 5).

This information is stored in registers RLR and ACN, as shown in FIG. 1, and is employed for generating microprogramme interruptions in the central processor.

DATA NETWORKS

Two data networks align the data which are transferred between the buffer storages and the main memory.

The data transferred are regrouped in words of four octets (plus parity keys).

The control of the alignment depends upon the address of the octet inside the storage word and the position of the octets in the buffer storage.

The bidirectional bus specialized in the transmission of the service codes enables transfer of states if it is connected with the BUS A which is the main bus of the central processor. A channel head unit can be disconnected from the channel command unit CCU. This characteristic is required in order to execute isolated routine tests.

FIG. 1 is a diagram of the central processor and of the main memory of an information system.

The main memory MMU consists of addressable units. By way of example, its capacity may vary from 256 kilo octets to 1024 kilo octets.

It is connected to the central processor CPU by the interface MIU. Across the interface MIU the memory MMU is connected on the one hand to the address calculation unit ACU and on the other hand to the data management unit DMU.

The address command unit ACU enables communication of data or instructions with the main memory. It transforms the segmented addresses into absolute addresses and memorizes the absolute addresses for the processings and transfers of data.

The ACU is furnished with an associative memory, as described in any of French Pat. Nos. 1,311,882; 1,339,558 and 1,294,650, which contains the segment numbers, rights of access, bases and limits of the eight segments most often employed.

The data management unit DMU enables transfer of data out and towards the main memory. It executes alignment operations on the operands and the instructions upon which it operates preselections and buffer storages. The data management unit DMU of FIG. 1 is well-known, per se, in the art as shown in the following U.S. Patent Nos. 3,618,045, issued 11/02/71; 3,665,487, issued 5/23/72; 3,639,912, issued 02/01/72; 3,495,220, issued 02/10/70; and 3,599,158, issued 08/10/71.

It acts upon the data inputs and outputs, aligns the data readings or writings, reads the programmes and aligns them and reads certain programmes from the main memory. The data management unit is directly in relationship with the channels command unit CCU.

The channels command unit CCU constitutes the interface between the central processor and the channels buffer unit CBU. It aligns the data inputs and outputs and memorizes the transfer parameters.

The input/output controller IOC, shown in FIG. 1, consists of the common channels command circuit and six channel heads CHU. The function of each CHU is to accept words of four octets proceeding from the CCU and to transfer these octets one by one across the peripherals sub-system interface PSI, or to receive successions of octets from the PSI and to assemble them so as to form words of four octets which are transmitted to the CCU. Each CHU includes for this purpose a buffer RF storage of 16 octets capacity, for example, for the input/output operations.

The maintenance panel unit PMU enables communications with:
the operator's panel SOP which enables command of the system by the operator,
the maintenance panel SSP and the maintenance channel MC which are employed not simultaneously for maintenance of the central processor.

The PMU is informed of errors detected during the operations of the processor and determines what must be the attitude of the machine as a function of the error. It likewise executes in addition the maintenance functions necessary to localization of an error.

The microprogramming memory unit RCU commands the operations of the central processor under certain conditions.

In this case:
it addresses the microprogramme words contained in the unit control memory CSU,
it memorizes the microprogramme word which is in course of execution,
it manages deviations and interruptions,
it controls the levels of execution of the microprogramme,
it controls the execution of the firmware.

The RCU transfers the microprogramme words of the command memory CSU towards the other units by means of the Bus A and calculates the next address of the microprogramme as stored within the CSU. Each microprogramme word may be, for example, of a length of four octets and may command simultaneously five microfunctions localized in different portions of the processor. RCU of FIG. 1 is a read only memory for controlling data transfer between the CSU and PCU. The RCU and CSU are described in a book entitled, "Microprogramming: Principle and Pracitces", by Samir S. Husson, published in 1970 by Prentice-Halline, of Englewood Cliffs, N.J.; see also "Computer Organization and Microprogramming", by Yao-Yaohan Chu, published in 1972 by Prentice Hall, Inc., of Englewood Cliffs, N.J. Typical characteristics of the control unit RCU are disclosed in the following U.S. Patent Nos. 3,400,371, issued 09/03/68; 3,370,274, issued 02/20/68; 3,380,025, issued 04/23/68; 3,268,872, issued 08/23/66; 3,302,183, issued 01/31/67; 3,391,394, issued 07/02/68; 3,302,183, issued 01/31/67; 3,477,063, issued 11/04/69; 3,391,394, issued 07/02/68; and 3,646,522, issued 02/29/72.

The arithmetical and logical stage ALU executes decimal/binary arithmetical operations and logical operations upon operands of four octets. It likewise executes the operations of calculation upon the segmented addresses, the memorization of rings and segment numbers, the operation of accumulation in the maintenance method. Such an arithmetic and logic unit is well-known in the art, per se, as shown in the following U.S. Patent Nos. 3,400,371, issued 09/03/68; 3,404,378, issued 11/01/68; 3,238,508, issued 03/01/66; and 3,201,762, issued 08/17/65.

The synchronization unit TEU contans a clock delivering the various signals employed by the CPU. It controls the transfer of the synchronization pulses and determines the length of the cycles of the CPU. It likewise includes three times measurement devices piloted by a quartz oscillator.

The local storage unit SPU is composed of a memory having writing and reading of 96 words, for example. It contains zones for memorizing the contents of the visible registers from the software point of view and for the paramenters of the system. In addition it contains working zones for each microprogramme level.

The emulation unit EMU forms the object of a U.S. Patent application Ser. No. 528,824, filed on the 30/11/73. for: "A system of processing information having a microprogramme switch in order to enable the system to work according to a native or non-native method of operation", by J. C. Cassonnet and A. Milleret.

Figure 2:
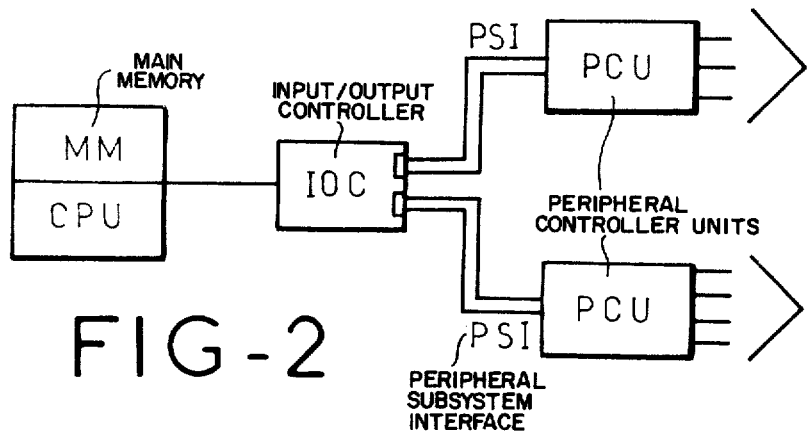
FIG. 2 is a schematic connection diagram of an input-/output controller IOC.

FIG. 2 is a simplified diagram of the role of the input-/output controller IOC. In this Figure are shown two peripheral controllers PCU, each being connected to a number of peripheral devices (not shown). The two controllers PCU are connected at their left to the controller IOC. The latter is connected to the central processor unit CPU/main memory MM.

As will be explained below, the CPU is employed partially for the introduction of data into the central memory, especially for the calculation of absolute addresses.

It has been calculated the statistically in an average system the information input and output operations would require about a tenth of the total processing time. The result is that the controller IOC only works during a tenth of the total processing time. That corresponds with a loss of time of use of the material.

In accordance with a characteristic of the present invention the controller IOC is integrated into the central processor CPU. In the latter a certain number of stages are purely IOC stages. In FIG. 1 these stages are enclosed in a dotted line bearing the reference IOC. It is a question essentially of the channels command unit CCU of the channel command circuit CCC and channel head unit CHU.

All the stages of the CPU mentioned previously cooperate in the input/output operations as they cooperate for all processing. However, special IOC registers have been introduced into the data management stage DMU and the capacity of the memory contained in the address command unit ACU has been increased. The schematic diagram in FIG. 2 therefore does not correspond with reality since the IOC forms (moreorless) part of the CPU.

In the course of the description what will be called the IOC is the whole of the means necessary to the transfer of information between the main memory and the peripheral devices. More precisely, the controller IOC will be the whole of the means which combine in the establishment of connections between the peripherals controllers PCU and the main memory, the IOC being able, however, under certain conditions to call upon the central processor CPU.

One object of the present invention is to establish means of sharing the resources between the IOC and the CPU. With this aim as will be seen below a grading of jobs gives priority to the input/output operations over processing operations proper.

Figure 3:
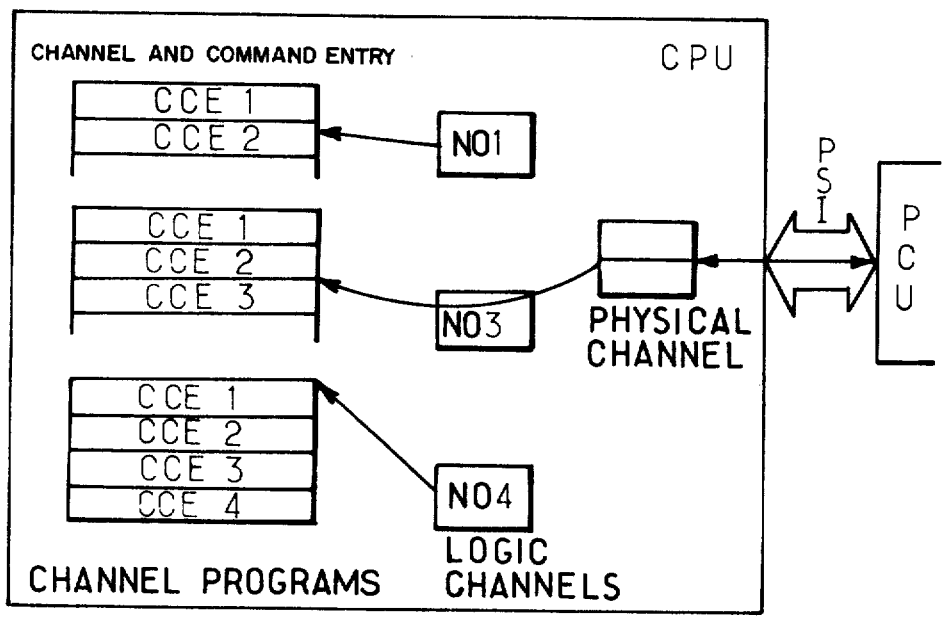
FIG. 3 is a diagram of the multiplexing of the channel programs on one physical channel.

FIG. 3 illustrates this multiplexing. In this Figure the controller PCU is assumed to have four logical channels. The channels 1 and 3 have a channel programme in course of execution (the arrows are pointing to CCE 2 and 3 respectively), channel 4 is placed in a queue and the programme has not commenced. Finally, no channel programme is associated with the logical channel no.2 (not shown) which is available. In FIG. 3 the PCU executes the channel command entry CCE#3 over the logical channel no.3. The PCU can ask for:

either the extraction of the next command from channel 3, or connection of the logical channel no.1 and extraction of the next command CCE#2 from the first channel programme, or the start of a new programme over the logical channel no.4.

The PCU does not necessarily have to await the end of the execution of a command. They can carry out the multiplexing in the middle or at any instant whatever during execution.

FIG. 4 is a more detailed schematic of the IOC. In this Figure there are shown on the right three PCU's, 1, 2 and 3. each being connected to peripherals of the same nature. Each PCU corresponds with a buffer storage in the form of the classification register RF by means of an interface PSI. This transfer is effected by a pointer lying in the local storage unit SPU which determines in the table of physical channels a physical channel entry PCE which in turn enables a channels table to be reached in which lie logical channel entries LCE. The buffer storages RF are all connected to a channel command circuit CCC the role of which has been described previously. At the output from the circuit CCC that data are in transit into the channel command, then into the DMU whence they pass into the main memory MM which contains besides the tables of physical and logical channels the channel programmes proper formed by channel command entries CCE which organize the work of the IOC.

The object of the IOC during a data transfer sequence is that the transfer rate across the interface PSI does not depend upon the PCU and is not affected by the execution of chaining of data. For this reason a buffer storage of a capacity of sixteen octets is introduced into each interface PSI. The interface of this buffer storage is 1 octet wide on the PCU side and 4 octets wide on the central memory side. The transfer rate between the central memory and the buffer storage (1.66 Megaoctets/s, for example) is higher than the highest transfer rate across the PSI for this interface (1.25 Megaoctets/s, for example). The chaining of data is executed by firmware when the count at the level of the main memory is terminated and during this execution octets may be transferred between the PCU and the buffer storage.

During a writing operation (MM → PCU) the octets are first of all transferred from the main memory MM to the buffer storage RF then towards the PCU.

During a reading operation (PCU → MM) the octets sent by the PCU are first of all memorized in the buffer storage RF then sent into the main memory.

The octets are transferred between the buffer storage and the main memory during a hardware/firmware sequence called the data transfer sequence or sequence DQ. This sequence is of a length of four octets. The position in the main memory where these data will come to be inscribed is obtained by an address of 20 bits located in a register SPA is the address command unit ACU. This address is brought to light at the end of each sequence DQ.

Management of the data transfers requires for each channel head CHU three counters which are:
- a first counter SPC located in the channel command unit CCU and which indicates the number of octets remaining to be transferred at the level of the main memory for the channel commmand entry CCE which is in course of execution;
- two other counters called L1 and L2 located in the channel head CHU, as shown in FIG. 1. L1 is employed for indicating the number of octets remaining to be transferred at the level of the PSI for the corresponding CCE and L2 is loaded with the length of the transfer indicated in the next CCE of the table DCA.

The counter L1 is decremented by 1 each time an octet is transferred over the PSI and the counter SPC is decremented at each sequence DQ by the number of octets transferred into the central memory.

A transfer of non-chained data is executed in the same fashion as the last CCE of the table DCA. A peripheral command or state is executed like a data transfer, the parameters (memory address and count) of which are directly calculated by the firmware.

Figure 9:
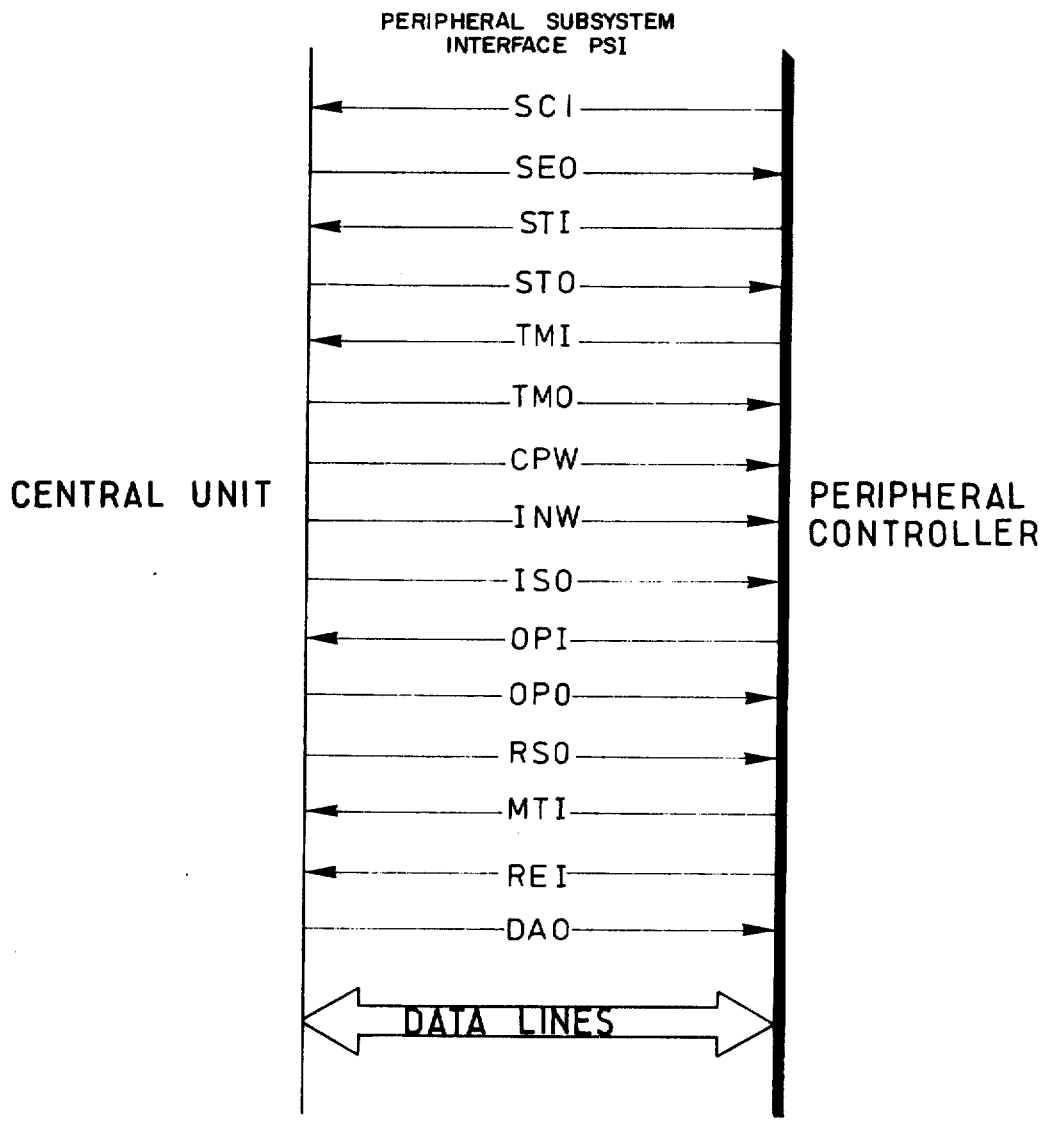
FIG. 9 represents the interface PSI.

Peripheral system interface PSI (FIG. 9)

This is a communication route enabling synchronizing of information transfers between the IOC and the corresponding PCU.

There are 25 signals PSI divided into two groups:
the 9 data transfer lines and the 16 control lines.

The data transfer lines (DL 0 to 7 and P) are bidirectional routes one octet wide (eight information bits and one odd parity bit). These data transmission lines are employed for transferring the information octets from the PCU over the IOC (reading operation) or from the IOC towards the PCU (writing). A reading operation may transfer either the information octets generated in the peripheral or a service code with or without associated information and vice versa.

The service codes are sent by the PCU towards the IOC for controlling the execution of channel programmes relative to the PCU. A group of service codes and associated information is called a service code sequence.

A writing operation may transfer data intended either for the peripheral or for the peripheral command register or a channel command, or an instruction IOC transmitted to the PCU in order to check the transfers into the IOC.

The control lines transmit the information across the interface, identify the sequences, terminate the transfers, modify the presence in the IOC of information, reset the PCU to zero, enable control of the system and organisation of the switchings PSI, enable verification or diagnostic of the PSI. All these lines are unidirectional.

The lines designated IN have their origin in the PCU and their end in the IOC, and vice versa for the lines designated OUT. For example, the lines service code IN(SCI), strobe IN(STI), etc., have their origins in the PCU, and the lines service enable OUT(SEO), strobe OUT(STO), etc., have their origins in the controller IOC.

An interface PSI placed at the disposal of the central unit CPU and of the peripherals controller PCU a certain number of resources which are illustrated in FIG. 9.

In this Figure the tie lines bear references representative of signals which have the following significance (the arrows indicate the direction of transfer):

SCI is the signal for initialization of a service code.

SEO is the output authorisation signal; it signifies that the input output controller is ready to receive a service code.

STI and STO control the transfer of data over the interface.

TMI is the signal for the end of transfer of the information emitted by the peripherals controller.

TMO is a signal for the end of transfer of the information emitted by the central unit.

CPW (Channel Program Waiting) is a signal which forewarns the peripherals controller that a channel programme is waiting in the hardware/firmware of the central unit.

INW is a signal which is employed for warning the peripherals controller that an instruction has been placed in the queue in the input output controller for sending to it.

ISO is a signal which signifies that an error has been detected in the transfer sequence and which informs the peripherals controller about it.

RSO is a signal which re-initializes the peripheral control unit and which puts it into a known state. In particular it enables immediate stopping of any dialogue between the peripherals controller and the input output controller.

OPO is a signal which indicates that the input output controller attached to the interface is operational.

OPI is a signal which indicates that the peripherals controller attached to the interface is operational.

MTI is a signal which is at one, every time the peripherals controller is executing at least one channel programme.

REI is a signal which is at one, every time the peripheral control unit is executing a channel programme and receives a particular command (of the channel dimension).

DAO is a signal which enables the interface PSI to be diagnosed.

Input output operations over the interface PSI are specified in channel programmes contained in the main memory and it is the peripherals controller which directs the input output operation as a function of the command contained in each channel programme. The peripheral control unit must therefore have access to the channel programme by employing channel programme pointers; it executes the channel programme by means of various operations such as: reading an initialization command, a data transfer, passing on to a new command, etc... This method of execution of the channel programme is obtained by means of service codes and the commands contained in the channel programme are transferred towards the peripheral control unit in response to the service codes. The service code may have significations such as: initialization of a new programme, start of a data transfer or renewal of an input output instruction, etc...

FIG. 5 shows the structure of a channel programme which is composed of the heading of the channel programme which consists of 4 words, the first word corresponding with the absolute address of the channel programme, CPAA, and of channel command entries CCE, each being composed of two words, the first dubbed CCW0 and the second CCW1.

The channel programme head contains the following information:
1. The channel number associated with the programme channel, which is composed of the logical channel number LC# and a number PC called the physical channel number which corresponds with the hardware of a particular interface PSI. One central unit can feed up to 12 peripherals controllers with 12 interfaces PSI.
2. The priority of execution of the channel programme as a function of a comparison with the other channel programmes.
3. The address $(G_i D_i)$ of the semaphore over which are directed certain messages during the execution of a channel programme.
4. The information giving the zone in which the detailed states of the peripheral apparatus may be memorized.

The form and size of the head of the channel programme is shown in FIG. 6.

A channel command entry CCE is concerned with a simple input/output operation over a peripheral apparatus. The two words contain:
1/ a channel command;
2/ a "flag" zone;
3/ the address information in CCW1.

Figure 13:
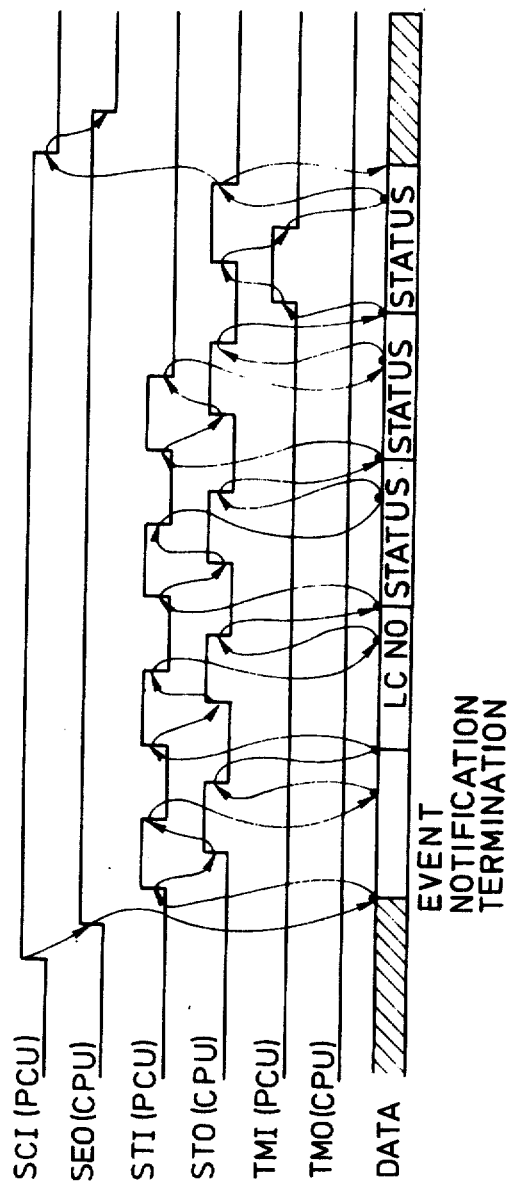
FIG. 13 is a diagram of the dialogue between the central unit CPU and the peripheral controller PCU over the interface PSI.

The different phases of execution of a channel programme are the following:
1. Connection phase. In this phase the channel programme is connected to the logical channel with which it is associated. The logical channel is placed in a queue of logical channels already connected to their own channel programmes.
2. Execution phase. In this phase the logical channel associated with the channel programme is withdrawn from the queue so that the peripherals controller can execute the channel commands contained in the channel programme.
3. Termination phase. The peripherals controller sends a message of notification of the end of emergency to the input/output controller of the central unit. FIG. 13 is a time-diagram illustrating a data transfer according to the reading method (the data are being sent from the peripherals controller towards the central unit) and illustrates the exchange principle which is adopted here. The signals STI and STO control the data transfers across the interface. The signal STI is produced at the same time as the putting of the data in place on the transmission lines. When the input output controller of the central unit is ready to receive the data it emits the signal STO. Reception of the signal STO by the peripherals controller causes resetting to zero of the signal STI which has the effect of checking by sampling and transfer of the data into the input buffer of the input output controller of the central unit. The relapse of STI causes in its turn the relapse of STO and the obliteration of the data on the transmission lines.

The main special features of this method of exchange of information between the IOC and the peripherals controller are:
0. Its bidirectional character, the writing and reading operations are effected over the same interface lines.
1. The sampling signals STI and STO are subordinated to one another.
2. The data are present on the lines at the same time as the sampling signal. This simultaneity eliminates the difficulties encountered in raising to an optimum the margin of safety to be provided between the moments of data transfer and of generation of the sampling signal.
3. Taking of the data into account in a buffer register can only take place at the end of 3 exchanges of signal across the interface. The first corresponds with the sending of the signal STI. The second with the reply by the signal STO. The third corresponds with the transmission of the falling front of the signal STI. There is therefore no possibility of error since the sampling of the data takes place across quite stable data over the lines of the interface PSI.
4. These last special features bring it about that the connection of a central unit to its remote peripherals controller needs no special precaution and renders the system of connection totally independent of the length of the connection.

The exchange mechanisms

Exchange of information across the interface PSI is controlled by a group of microinstructions contained in the memory of the peripheral control unit. When the peripherals controller desires to communicate with the input output controller IOC of the central unit it executes a macroinstruction $PSI_o$ accompanied by a service code which specifies the nature of the dialogue which is to be executed.

This may be in particular the initialization of a new programme, the displacement of a pointer initializing a data transfer, the initialization of a notification of emergency, the initialization of a termination. The "microoperating system" of the peripheral control unit executes the operation requested.

The service codes provide access to the contents of the different CCE contained in the main memory of the central unit.

In order to set going or execute a new channel programme the input output controller receives an initialization service code. The line CPW across the interface PSI is then high. The service code is transmitted over the data lines of the interface. The different channel programmes are drawn up in the queues and the input/output controller withdraws from the queue the number LC taken into the head of the channel programme which is the first to leave the queue with the highest priority, the channel command and the flag contained in the first CCE of the channel programme.

The input output controller initializes the two channel programme pointers CMP and CWP.

CMP points to the first word of the first command entry CCE.

CWP points to the first entry PCE.

Every time the execution of a channel command is terminated the peripherals controller emits a service code in order to displace the channel command pointer by changing the values of CMP and CWP.

If the channel command of a first CCE is a data transfer or if in the sequence of the service code the displacement of the channel programmes pointer is a displacement followed only by the transfer of a channel command which is a data transfer the peripherals controller emits a service code for data transfer initialization.

Data transfer between the input output controller and the peripheral control unit cannot occur before the peripherals controller has sent the service code sequence for initialization of a data transfer. The sequence of initialization and execution of a channel programme is therefore the following.

The input output controller positions CPW at 1.

The peripheral control unit emits a service code for initialization of a new programme.

The input output controller brings out from the queue the logical channel number and the first CCE and transmits them to the peripherals controller which executes the first CCE.

The peripheral control unit next emits a service code for displacing the command pointer. The next CCE which may be a data reading is then sent to the peripheral control unit. A service code for data transfer initialization is then sent from the peripheral control unit towards the input output controller. The data are next transferred in execution of the CCE, then the service code for displacing the channel command pointer is again emitted by the peripherals controller.

The form and size of the CCE for data transfer is represented in FIG. 8. The channel commands associated with this particular CCE determine the control operations of the PCU or the data transfer between the peripheral apparatus and the main memory.

The zone marked "count" defines the dimension in octets of the main memory area towards or from which the transfer will take place.

The next word consists of the absolute address of the first octet of the area of the buffer in the main memory for the data transfer implied by the corresponding channel command.

Figure 10:
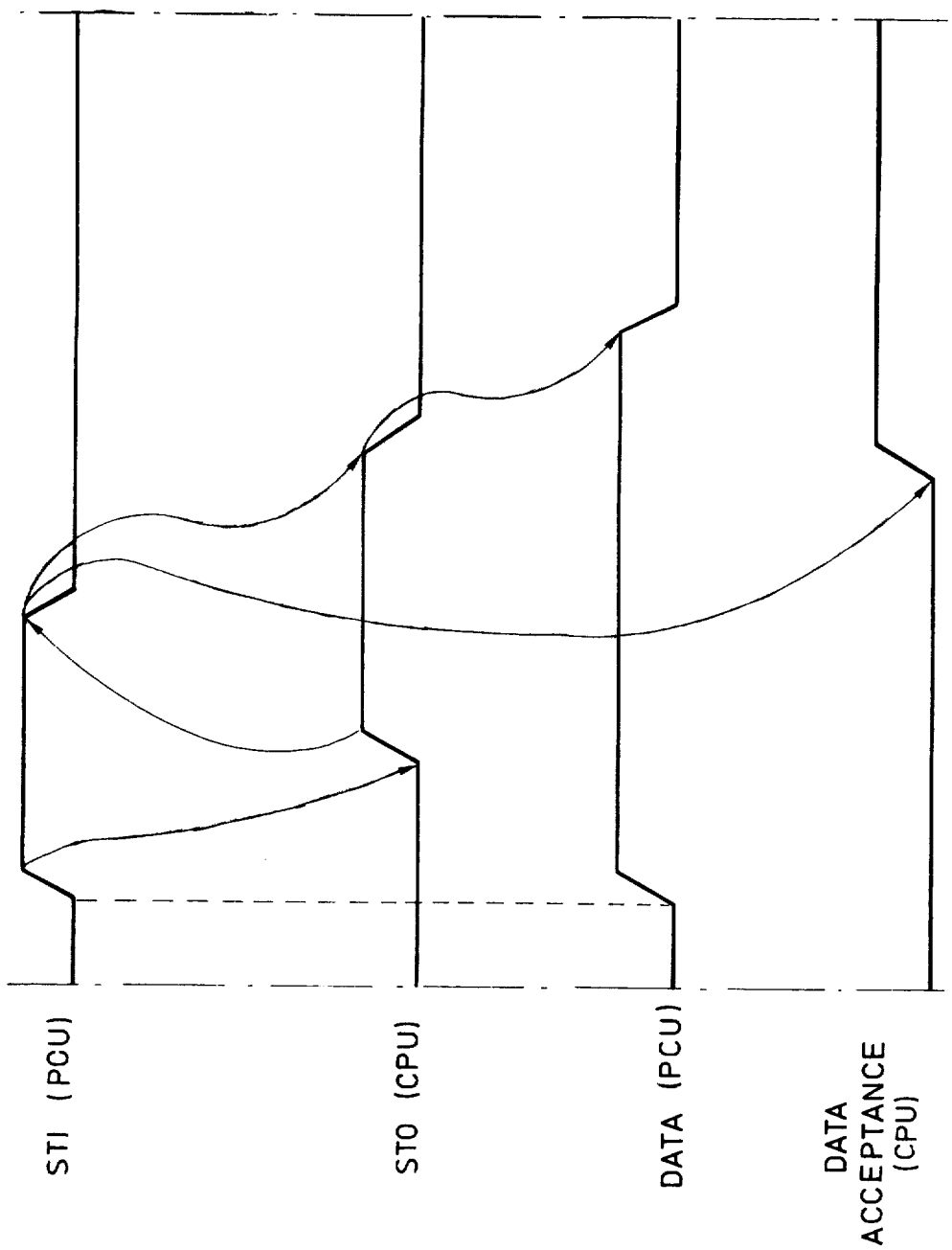
FIG. 10 is a time-diagram representing the execution of a channel program.

FIG. 10 shows a time-diagram corresponding with the initialization procedure for a new programme and with its consequences.

A service code for initialization of a new programme is issued from the peripheral control unit in response to the signal CPW in order to enable transfer of a logical channel number of a copy of the first channel command entry, from the central unit towards the peripheral control unit PCU.

In the Figure the signal CPW generates the signal SCI for initialization of a service code which generates SEO and the despatch over the data bus of a service code by the peripherals controller for initialization of a new programme. This service code, following the principle of data exchange locking explained previously, is generated at the same time as the sampling signal TMI which causes the signal STO which causes the relapse of the signal TMI which induces the taking into account by the central unit of the service code and the relapse of the signal STO in the central unit which causes in its turn the relapse of the signal SCI and obliteration of the service code on the transmission bus, the relapse of the signal SCI bringing about the relapse of the signal SEO. The new programme having been initialized, the central unit sends a sequence of octets the first of which corresponds with the number of the logical channel associated with the channel programme and the second up to the last with the first and the last octets contained in the channel programme. In the Figure it is seen that each octet is sent over the data bus at the same time as the signal STO and that the taking into account of the octet in the peripherals controller takes place at the detection of the relapse of the signal STO by the peripherals controller and that in accordance with the locking principle stated previously actually 3 transmission times over the line PSI pass by before the data transferred are really taken into account. During the transfer of the last octet of the channel programme the signal TMO replaces the signal STO in order to signal that it is a question of the last octet contained in the channel programme.

Figure 11:
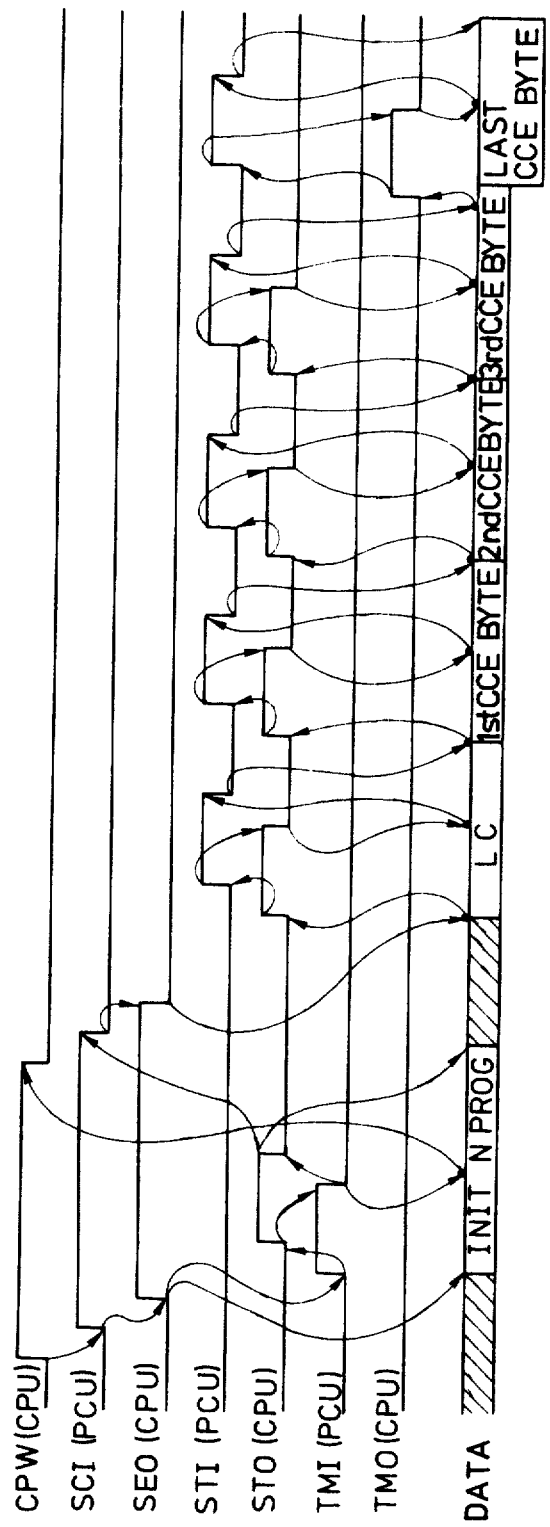
FIG. 11 is a time-diagram representing the commencement of a data transfer.

FIG. 11 shows a time-diagram corresponding with the initialization procedure of a data transfer. The service codes for data initialization are employed by the peripheral control unit for commencing or resuming data transfer across the interface PSI in accordance with the contents of the information previously transmitted towards the peripherals controller. The logical channel number may be sent or not sent by the service codes.

For initializing a data transfer the peripherals controller positions the signal SCI at 1 (initialization service code) which causes setting to 1 by the central unit, of the signal SEO. Upon reception of SEO the peripherals controller positions the service code on the data line and at the same time sends the sampling signal STI. Upon reception of this signal the central unit generates STO which when it is received by the peripherals controller resets to zero the signal STI. The relapse of the signal STI when it is detected by the central unit samples and takes into account the service code in the central unit. The relapse of the signal STI causes in its turn the relapse of the signal STO. The sampling signal TMI is emitted in place of STI at the same instant as the logical channel number is emitted by the peripherals controller. The sequence of taking into account the logical channel number is identical with that of data transfer initialization. The relapse of STO causes the relapse of SCI which causes the relapse of SEO which causes the data transfer proper from the peripherals controller to the central unit. The data are transmitted at the same instant as STI and the taking into account occurs at the relapse of STO.

In the development of a process there can be produced the 2 following eventualities:
 certain asynchronous emergencies take place in the direction of the peripheral system;
 the channel programme has called for a programme incident by having the emergency notification bit established in the flag zone of the CCE.

They have as a consequence the generation of a service code for initialization of notification of an emergency. If the message of notification of an emergency cannot be memorized within a queue for notification of emergency, the input output controller emits ISO and prepares an instruction by informing the peripherals controller in order to store the message in the peripheral sub-system. If the message can be memorized the input output controller assembles and memorizes the message.

The service code is followed by a logical channel number taken from 1 to 3 octets of peripheral states;

these states will accompany the emergency notification message as far as the software.

The service codes for the end of initialization are emitted by the PCU in order to cause the end of a channel programme.

A logical channel number may accompany this service code or not. However, if states are transmitted with this service code a logical channel number can be sent.

Figure 12:
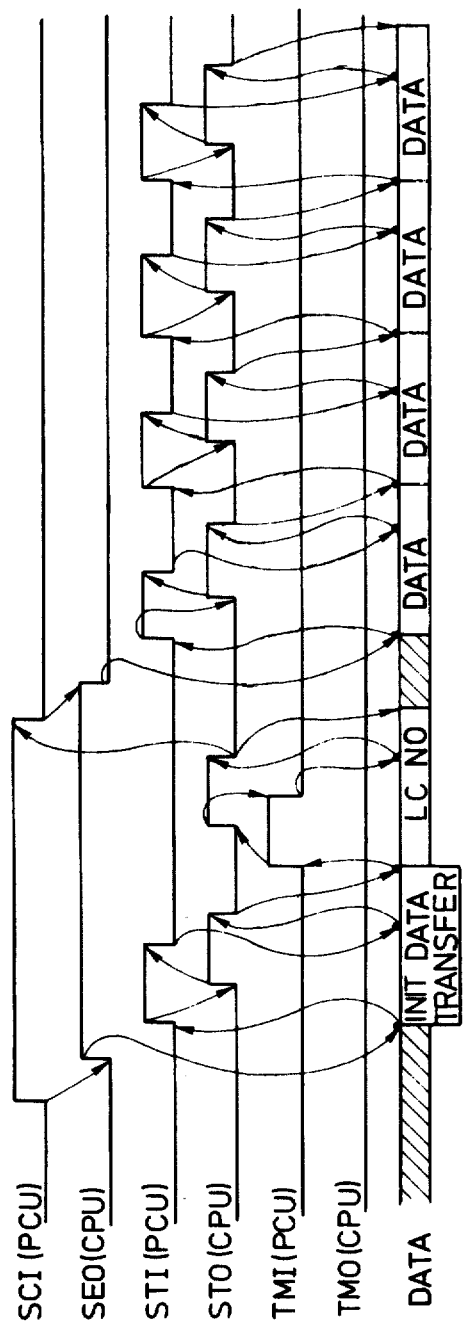
FIG. 12 is a time-diagram representing the end of the execution of a data transfer.

FIG. 12 is a time diagram representing the service code sequences for initialization of notification of emergency and for end of initialization according to the principle of auto-subordination of the information exchanged. It will be observed that the signal TMI is sent during the sending of the last octet of the sequence.

A channel programme may be terminated normally or in an abnormal fashion. In the first case the last CCE transmitted marks the end of the channel programme and in the second case the execution of the channel programme is stopped upon the execution of an intermediate CCE. In either of these cases the peripherals controller emits towards the central unit a service code for initialization of termination followed by the logical channel number LC and by the transfer of the summary states. The sequence illustrating the termination phase of a channel programme is given in the Figure and is identical with that of notification of emergency.

Execution of channel programmes

The execution of a channel programme necessitates different phases. During the connection phase the channel programme is connected to a logical channel with which it is associated. The logical channel is then placed in a queue of logical channels already connected to their channel programmes.

The execution phase is the phase in the course of which the logical channel is withdrawn from the queue and the PCU executes the command instructions contained in the channel programme.

During the terminal phase the PCU sends an end-of-programme message.

In order to execute a channel programme the appropriate logical channel is connected to it by the instruction CONNECT.

The instruction CONNECT introduces the absolute address of the channel programme (CPAA) into the entry (LCE) to the associated logical channel and brings it into a queue of logical channels which all pass through the same physical channel.

If at least one logical channel is waiting the line CPW is brought to the logical state 1.

There is for each physical channel a queue of logical channels which are awaiting their execution (Q/LC/INI).

Each queue organizes the logical channels in accordance with their order of call by the corresponding PCU.

Each logical channel the channel programme of which has received a start of execution is withdrawn from the queue in which it was placed. When all the channels have been withdrawn from the queue the line CPW relapses to zero.

Chaining

The logical channels placed in the queue Q/LC/INI are placed in the order or priority of the associated channel programmes and for each level of priority in the order of arrival.

When the peripheral control unit PCU asks for the execution of another channel programme the logical channel withdrawn from the queue is in the highest level of priority the first to have arrived (this is the rule first in first out, FIFO). The PCU asks for the execution of another channel programme by sending to the IOC a service codes sequence INP (commence another programme). This sequence is written on an octet.

Each logical channel is associated in the queue with a connection. It is a matter of a zone in the logical channel entry LCE containing the number of the next logical channel (N.CCE) in the queue and the priority of the channel programme associated with the next logical channel (PRI).

The head-of-the-queue connection contains the number of the first logical channel in the queue and the level of priority of the associated channel programme stored in the entry to the corresponding physical channel.

The execution of a channel programme is controlled by the PCU by means of a service code sequence. The service code sequences give access to the contents of the channel command entries of the channel programme by means of two pointers, the command pointer and the control pointer (FIG. 5).

The command pointer CMP can point exclusively at the word of command CCW0 in a channel command entry. This pointer is an absolute address and indicates the channel command entry CCE the programme of which is in course of execution. It is stored in a word in the physical channel entry PCE corresponding with the channel programme.

The control word pointer (CWP) can point to any channel command word at all within a channel programme. CWP is an absolute address and enables access to the contents of the words CCW0 and CCW1 in the channel command entry the programme of which is in course of execution.

The address CWP is stored in a word in the local storage SPU (word PAO) corresponding with the physical channel over which the channel programme is being executed.

Service code sequences

When the logical state of the line CPW is equal to 1, at least one logical channel associated with a channel programme is awaiting its execution in a queue Q/LC/INI.

In order to commence execution of the channel programme associated with the first logical channel in the queue the PCU sends to the IOC a service code sequence called: "start of a new programme", over the data transfer lines of the PSI.

The IOC extracts from the queue the first logical channel and sends the PCU the number of the logical channel taken into the head of the channel programme and the first channel command entry CCE. The IOC initializes the two channel programme pointers CMP and CWP from the programme absolute address stored in the logical channel entry LCE corresponding with the channel programme. The pointer CMP points to the word of command CCW0 in the first channel entry CCE and the pointer CWP points to the word CCW1 in the first channel command entry or to CCW0 in the second entry depending upon the type of channel command in the first entry.

Displacement of the programme pointers

Every time the execution of a channel command is terminated the PCU sends the IOC a service code sequence for displacing the channel programme pointer.

The main function of this service code is to change the values of CMP and CWP. There are a number of possibilities:

command repetition: CMP and CWP point again to the same channel command entry. This possibility is employed when the PCU desires to recommence the channel command which it has just executed;

normal method: CMP and CWP point to a new channel command entry and are displaced forwards either by one channel command entry CCE (incremental method) or by 2 or a number of entries CCE (leap method);

recommencement of salvo: CMP and CWP are not displaced and still point to the same channel command entry CCE. This possibility is employed if the PCU desires to recommence a data transfer in salvo with respect to the channel command entry which it was in the act of executing.

This service codes sequence indicates what action must follow the displacement of the pointers CMP and CWP which may be:

either a transfer of data of low priority without channel command transfer;

or a transfer of data of high priority without channel command transfer;

or a channel command transfer;

or a channel command transfer and a transfer of data of high priority if a data transfer is asked for by the channel command (combinative method).

The level of priority of data transfers is defined by the peripheral control unit PCU

Start of data transfer

In one of the following cases:

data transfer requested by the channel command of the first entry CCE of the channel programme;

a service code sequence for displacement of the pointers indicates a displacement of the pointers followed only by a channel command transfer; a data transfer is requested by the channel command. The data transfer cannot commence before the PCU sends the IOC a service code sequence called the start of data transfer.

The development of the execution of a channel programme is the following:

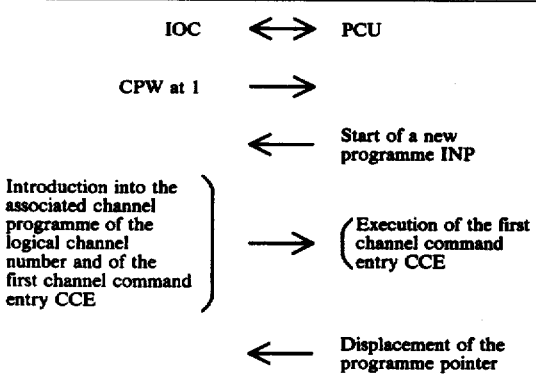

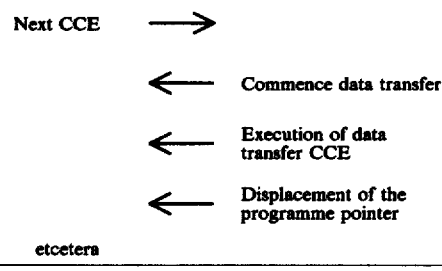

etcetera

Channel command

There are six types of channel command:
data transfer: reading/writing/input control/output control;
control without data transfer;
unconditional branching (UCB);
test and preparation;
control without data transfer (immediate)
conditional branching (immediate): conditional normal
branching/index branching.

These channel commands are all executed by the PCU with the exception of the unconditional branching UCB and the command for test and reset to zero which are executed by the IOC.

The commands called "immediate" are characterized by the presence of a "flag" indicator brought to logical level 1. A channel command entry is represented in FIG. 5.

Form and size of the data transfer entries: FIG. 6

The channel commands associated with this type of entry characterize the data transfers between the peripherals or the control registers of the PCU and the main memory.

The field of count characterizes the length in octets of the buffer area of the main memory towards or away from which the transfer will be effected.

This field of count is never nil.

The absolute address of the data buffer storage is the absolute address of the first octet of the main memory for the transfer of data achieved by the corresponding channel command.

Method of execution of the channel command entry

Every CCE contains a data chaining indicator and a command chaining indicator which are employed for indicating by what method it is to be executed. In the command chaining method the catenation indicator of every entry CCE of a channel programme is set to logical zero. Every entry CCE is sent to the PCU to be executed, except if the CCE is an unconditional branching UCB or a test which are executed by the IOC as has been seen above. The chaining command indicator is at the logical state 1 except in the last entry CCE of the channel programme where it is at zero.

In the data chaining method the transfers of blocks of data are catenated without interruption, even if the sources and destinations of these blocks in the main memory are not contiguous. The blocks of data are catenated by employing a group of command entries CCE located in a chaining table DCA. The entries lying in the table DCA are only data transfers for branchings or test commands.

Every entry CCE defines the transfer of a block of data. In the table DCA all the transfers must be of the same type, writing or reading.

In every channel command entry CCE of a table of chained data (DCA) the chaining indicator is brought to logical 1 except in the case of an unconditional branching (the case in which the indicators are ignored) and in the last entry CCE of the DCA the indicator of which is at logical zero. The chaining command indicator in every CCE of the table DCA (chained data table) is at logical 1 with the exception of the last.

Only the first entry CCE for data transfer command is transmitted to the peripheral control unit PCU. Thus the PCU having been informed of a transfer of data by the chained method (writing or reading) considers the table DCA only as an ordinary channel command entry. The other channel command entries are executed by the IOC. The transfer is terminated when the IOC brings the line TMO to logical 1 or when the PCU raises the line TMI. In a channel programme there may be channel command entries and tables DCA executed conjointly.

Figure 15:
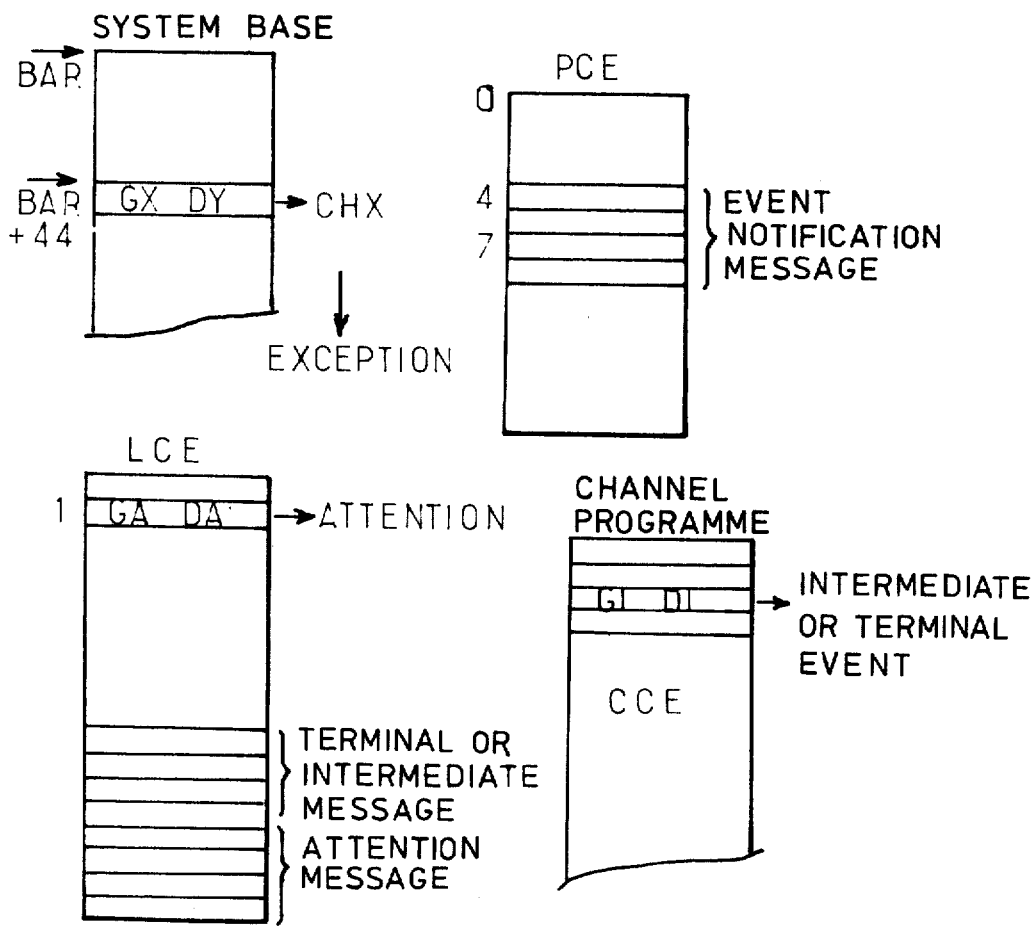
FIG. 15 is a diagram of the procedure for notification of emergencies.

Messages of notification of emergency:

FIG. 15 represents the different types of messages and their locations.

During the execution of a channel programme the PCU and/or the IOC can generate messages of notification of emergency relative to emergencies which have been produced in the IOC or the PCU.

The information contained in the messages consists of a summarized state of the PCU (PSB Nos. 1, 2 and 3), a summarized state of the IOC, parameters relative to the execution of the channel programme and the object of the notification. There are two zones in each LCE (see FIG. 18) and one in each PCE employed for the temporary storage of the messages between their emission and:
either the execution of simulated operations V carried out later over the semaphores,
or the execution of instruction FLCH (extraction of the logical channel) in order to withdraw the messages from these zones.

There are three categories of emergencies I/O.

Category I

Emergencies relative to the execution of channel programmes and synchronized with the execution of these programmes. This category comprises:
the intermediate emergencies which are relative to the execution of channel command entries in which the emergency notification flag is brought to 1.

Intermediate messages of notification of emergency are generally by the PCU or PCU's if the channel commands are executed by the PCU and by the IOC in the opposite case.

End or termination emergencies

The end of a channel programme may be normal (end of programme) or abnormal. Normal termination is commanded by the PCU and abnormal termination is commanded by the PCU or the IOC.

These messages of notification are always memorized in words 8 to 1 of the logical channel entry (see FIG. 18). These messages are placed on semaphores $G_i D_i$ by simulated operations V. The address $G_i D_i$ is stored in the heads of the associated channel programmes.

Category II

Attention emergencies are emergencies which are not directly connected with the execution of the channel programmes nor synchronized with this execution although relative to the peripheral controllers PCU. Attention emergencies are always generated by the PCU and they are memorized in the words 12 to 15 of the corresponding entries LCE. Simulated operations V enable them to be placed on semaphores $G_a D_a$. The system address $G_a D_a$ is inserted in a field of LCE for the instruction LLCH (load logical channel).

Category III

Channel exception emergencies are emergencies which imply changes in the operative conditions of the physical channels or of the IOC. These messages can only be generated by the IOC. They are always stored in the words 4 to 7 of the corresponding physical channel entry PCE. Simulated operations V enable them to be placed on a semaphore $G_x D_x$ the address of which is memorized in a field of the system base CHX in the central memory.

The intermediate emergency messages are sent by the PCU every time the emergency notification indicator is brought to 1.

An attention message is addressed by the PCU to the IOC every time an important emergency asynchronous with the execution of the programme is produced in the PCU.

In both cases the PCU interrupts the execution of the channel programme and sends the IOC a service code sequence which is composed of:
an emergency notification initialization code,
the logical channel number corresponding with the channel programme,
a summarized state (of maximum 3 octets).

The development of these exchanges is the following:

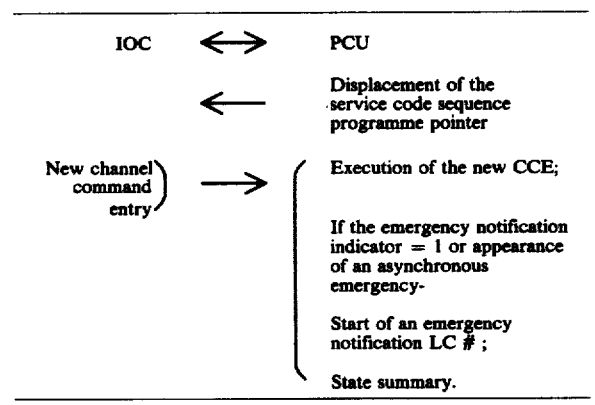

The state summary may be composed of three octets of peripherals state: PSB#1 PSB#2 PSB#3.

The PSB#1 may have 2 formats: intermediate and attention.

The PSB Nos. 2 and 3 are specific to the PCU.

All three are inscribed in the logical channel entry LCE of the channel programme in the words B and F respectively.

End of the execution phase of a channel programme

When the last entry CCE of the channel programme has been executed the PCU must decide whether it should or should not send a detailed state to the IOC.

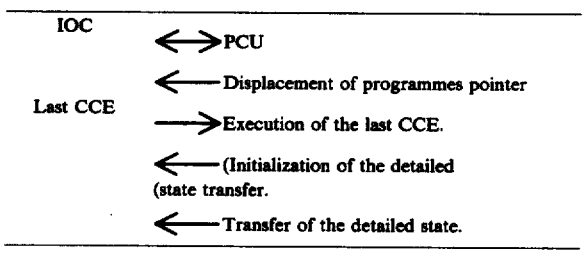

This detailed status consists of one octet of the state of a peripheral PSB#1 of intermediate type as in the case of the summarized state, and of a variable number of octets PSB, depending on the PCU.

The detailed status is stored in the central memory. The detailed state placed in the head of the channel programme indicates the quantity of state octets that the PCU must send and the address of these octets in the central memory.

A channel programme executed normally or having been interrupted in a case of error is always terminated by a final phase. During this phase the PCU sends the IOC an end-of-execution message thanks to a service code sequence called "start of termination".

This service code sequence is composed of:
 a start-of-termination code;
 the logical channel number LC# corresponding with the channel programme;
 if necessary a summarized state of three octets.

The summarized state contains a first octet which may take two formats: a normal termination format and an abnormal termination format which represents three cases: miscarriage, recoverable or not, and manual intervention.

The octets PSB Nos. 2 and 3 are specific to the PCU and are inscribed in the entry of the logical channel corresponding with the channel programme.

The instructions IOC

During the execution of a channel programme, the IOC may have need of sending information to the PCU, for example, in the case where an error has been detected. This is the role of the instructions IOC. In order to send an instruction IOC to the peripherals controller the IOC points the line ISO or the line INW (FIG. 9) at the logical level 1 and waits until the PCU addresses to it a service code sequence called "start of instruction IOC". The IOC raises the signal ISO every time the instruction IOC to be sent is an instruction asynchronous with the execution of the channel programme. That is produced in the case where an error has been detected or in the case where the fields reserved for the summarized state of the logical channel entry are occupied by octets PSB and are not available for receiving another summarized state which the PSU desires to store by sending one of the service code sequences: start of emergency notification, or start of end of programme. The instruction IOC called STACK informs the PCU that it must temporarily put the sequence in a stack as well as the summarized state which it contains.

The IOC raises the signal INW every time an asynchronous instruction is to be sent to the PCU. That occurs in the three following cases:

Instruction DISCONNECT

When the CPU (central processor unit) executes an instruction DISCONNECT with a view to disconnecting a channel programme, the IOC creates an instruction DISCONNECT which is sent towards the PCU with the number of the logical channel corresponding with the disconnected channel programme the execution of which is entering the final phase.

The instruction DISCONNECT like the instructions following are input/output instructions I/O. They are software instructions which form part of the channel programmes.

Instruction RESUME

If the PCU (peripheral control unit) has suspended the execution of a channel programme in consequence of the receipt of an instruction "SUSPEND", in order to resume execution of the suspended channel programme the central processor CPU executes the instruction RESUME. The IOC then creates an instruction RESUME. This instruction IOC is sent to the PCU with the number of the logical channel corresponding with the suspended channel programme and the PCU must resume execution of the channel programme.

The IOC has previously sent the PCU the instruction IOC.

Instruction STACK

When the fields reserved for the summarized state in a logical channel entry are free this summarized state put in a stack in the PCU as a result of the instruction STACK, may be sent towards the IOC which creates the instruction UNSTACK which is sent to the PCU. The "summarized state" fields may be freed in two ways:
 a. by the instruction IOC to extract the logical channel (FLCH);
 b. between the execution of two instructions by the central processor it analyses the state of the signal PRR relative to the system controller. IF PRR = 1, minus one octet of summarized state is occupying its reserved zone in the LCE and the CPU frees all the other state zones of the logical channel entries.

Different channel programmes may be executed over any one physical channel. Different instructions IOC producing the raising of the line INW of the PSI and associated with their channel programmes can be waiting simultaneously to be sent to the corresponding peripherals controller PCU.

The logical channels relative to the instructions IOC in a state of waiting are placed in a queue Q/LC/INW. There is one queue per physical channel. Each queue draws up the logical channels in the order of arrival of the associated instructions IOC. When an instruction IOC has been sent to the required PCU the logical channel is withdrawn from the queue. When all the logical channels have been withdrawn from the queue the line INW is reset to zero.

Chaining

Thv logical channels in the queue Q/LC/INW are classified by order of arrival of the associated instructions IOC. If a second instruction IOC is to be associated with a logical channel which is already in the queue the logical channel keeps its original position and is not placed in the queue a second time.

Unchaining

When the PCU sends an initialization sequence for a service code it receives the instruction IOC associated with the first logical channel introduced into the corresponding queue.

The logical channel is then withdrawn from the queue.

If a second instruction IOC has been associated with this logical channel the latter is withdrawn from the queue only when the two service code sequences have been received by the IOC.

Queue connections

Each logical channel is associated with the queue by a connection. It is a question of a zone in the logical channel entry LCE containing the number of the logical channel next in the queue (next channel number) NL (see FIG. 18).

The queue head contains the number of the first logical channel in the queue and is inscribed in the appropriate physical channel entry (PCE).

Multiplexing of logical channels

Different channel programmes associated with the logical channels may be executed simultaneously. The peripheral control unit PCU commands by multiplexing the employment of one physical channel.

Passing from one channel programme to another channel programme (from the exploitation point of view) is effected by the PCU which sends a service code sequence containing the number of the logical channel associated with the new channel programme. In this case the execution of the first programme is interrupted and that of the second commences.

During the execution of a channel programme the pointer CMP is inscribed into the PCE, and CWP into a local storage (address Pad Word PAO) corresponding with the physical channel over which the data transfer is being executed. When the channel programme is interrupted in order to enable another programme to be run, the pointers of the first programme are memorized in a special zone of the logical channel entry. The pointer CMP of the new programme is sent from the LCE towards the physical channel entry PCE and the pointer CWP of the new channel programme is sent from the LCE towards the main memory.

The case of data transfers

The PCU can interrupt a data transfer in order to enable another channel programme to develop. During a data transfer, for each octet transferred the IOC memorizes:

in the local storage PA1 the absolute address in the main memory of the octet being transferred in a word corresponding with the physical channel in which the data transfer is being executed;
  the number of octets remaining to be transferred in the word of a working counter SPC corresponding with the physical channel over which the data transfer is being executed.

If the data transfer is interrupted the IOC puts into reserve the appropriate channel entry:
  the pointers CMP and CWP
  the absolute address in the central memory, of the last octet transferred. This is the data address.
  the number of octets which remain to be transferred. This is the residual value.

If after the interruption of a channel programme the data transfer must be resumed for another channel programme, the pointers, the data address and the residual count for counting are extracted from the logical channel entry LCE and introduced respectively into the physical channel entry (CMP), into the address entry (CWP and data address) and into the working counter (residual value).

The service code sequence "start of data transfer" is employed for controlling a data transfer.

With this aim the octet of the service code contains a bit which indicates whether the data transfer is commencing or is being reinitialized.

The case of detailed state transfer:

As in the case of data transfer a detailed state transfer may be interrupted by a channel programme associated with another logical channel and then resumed. When the detailed state transfer is interrupted, only the data addresses and the residual value are put into storage in the corresponding logical channel entry.

The sequence of service codes called "start of detailed state transfer" is employed for commanding the state transfer. One bit of the octet indicates when the transfer is commencing or continuing.

Transfer of salvos of data or detailed states:

When a PCU interrupts and then restarts a data or detailed states transfer, in order to optimize the use of the resources the block of data or of state is separated into one or two portions. Each portion of the block implicated in a partial transfer is called a data or state salvo.

Repeat attempt at transfer of a data salvo

When transfer of a salvo is terminated the PCU may attempt the transfer again. The parameters for the new attempt are stored at the start of the transfer of the salvo in the corresponding reserved zones of the physical channel entry. These parameters are:
  the pointer CWP;
  the residual value of the count:
  the absolute address of the first octet of the salvo being transferred.

A pointer displacement sequence is employed for recommencing the transfer of a data salvo.

It is not possible to reattempt a data transfer.

A semaphore is a data structure which comprises essentially a counter SCT and one or more pointers employed for putting into relationship a process and an emergency which are not produced simultaneously.

An operation P carried out over a semaphore by a process enables the presence of an emergency to be made sure of. An operation V carried out over a semaphore enables the presence of a process to be made sure of in expectation of an emergency.

Certain blocks of firmware have the possibility of generating particular messages which may be communicated to the processes and to the channel programmes forming pseudoprocesses. The operation V accomplished by the firmware blocks for communicating a message is called a simulated operation V. In the particular case of a simulated operation V access to the semaphore is obtained by its name system G.D whereas in conventional P and V operations access to the semaphore is obtained by means of a semaphore describer.

Figure 16:
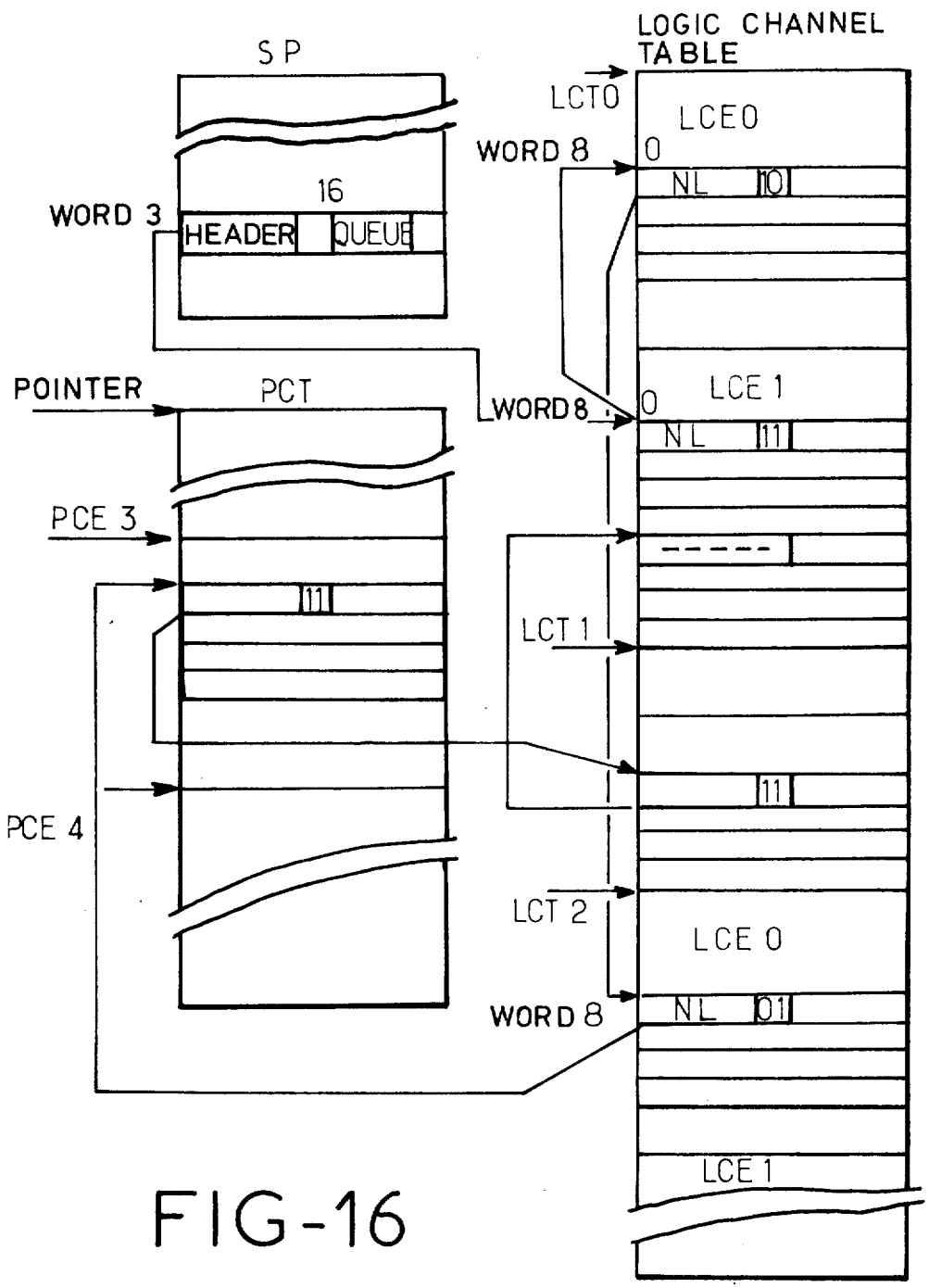
FIG. 16 is the representation of a queue Q/MS/EVQ.
Figure 20:
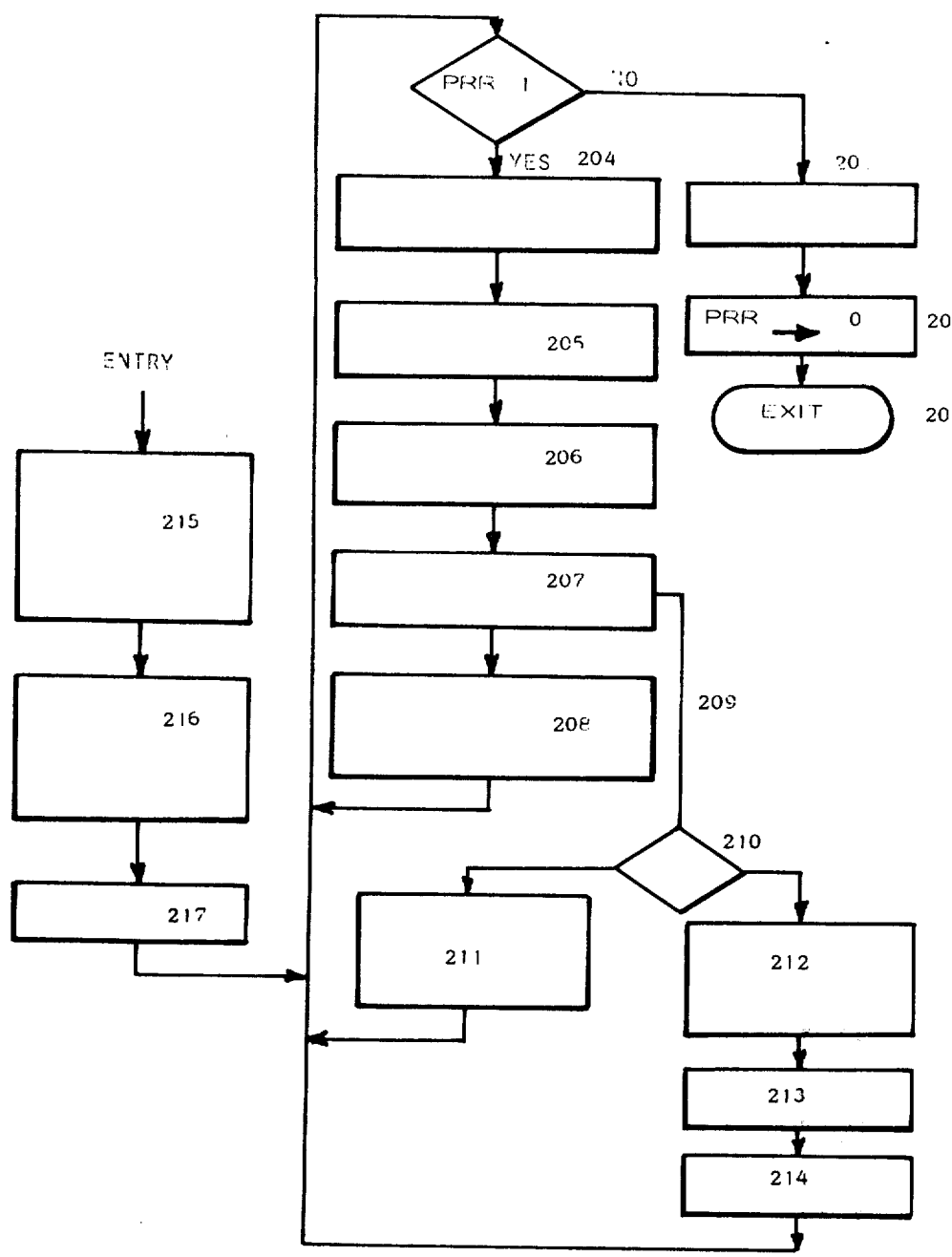
FIG. 20 is a program for processing messages.

FIG. 16 represents the queue Q/MS/EVQ and FIG. 20 the programme for processing the queue. When messages of notification of emergencies are generated and stored in the appropriate LCE and PCE they are placed in a queue where they await being extracted by the instructions FLCH or by a simulated operation V. There is only one queue Q/MS/EVQ for the IOC and all the physical channels. If at least one message is waiting in the queue the signal PRR is brought to 1 (phase 200 of FIG. 20). PRR = 0 signifies that the queue is empty. The messages are arranged in the queue in the order of their arrival.

FIG. 16 represents the structure of the queue Q/MS/EVQ. The word 3 of the local storage unit SPU gives over the first two octets the address of the head of the queue and over the last two octets the address of the queue of queues. The storage zones of the logical and physical channel entries containing the messages in the queue Q/MS/EVQ form the queue connections. A field of half-a-word in each connection NL contains the relative address of the next connection with respect to the PCT.

These relative addresses are:
the address of word 4 of a PCE channel exception notification message connection or the address of word 8 of a logical channel entry (intermediate or termination notification message connection);
or the address of word 12 of a LCE (attention notification message connection).

These relative addresses are multiples of 16 so that the four lightweight bits are at zero. In the half-word of a connection reserved for the relative address of the following connection, the four bits are forgotten about. The bits 14 and 15 give the nature of the relative address. If these bits are respectively at 0, 1, it is a matter of the relative address of word 4 of a physical channel entry PCE. If they are at 1, 0, it is a matter of the relative address of word 8 of a LCE and at 1, 1, of the address of word 12 of a LCE. In FIG. 16 the queue head of word 3 of the storage SP is pointing to word 8 of LCE1, of LCT0 which is pointing at word 8 of LCE 0, of LCT2 which is pointing at word 4 of PCE4 which in its turn is pointing at word 12 of LCE 0 of the table LCT 1 which in its turn is pointing at word 12 of LCE1 of LCT0 which is empty.

Output from the queue Q/MS/EVQ may be effected in the following fashion. In FIG. 20, if PRR = 1 there is at least one message in the queue (204). This message may be withdrawn from the queue by an instruction I/O FLCH (extraction from the logical channel). Between two instructions of the central processor the signal PRR is tested by the system controller. If PRR is at 1 the microprogramme in course of execution is interrupted and the request manipulation stage carries out a simulated operation V (205) until the queue is empty and PRR is brought back to zero. A microprogramme interruption is defined as a deviation. The simulated operation V has different functions:
to extract a message form the queue Q/MS/EVQ, the first message to leave being the first that came in;
to try to place this message on the corresponding semaphore which is $G_aD_a$, $G_iD_i$ or $G_xD_x$ as a function of the nature of the message (phase 207). If this attempt is successful (208) the message is extracted from the queue and from the corresponding PCE or LCE and is placed on a semaphore. If the message cannot be placed on a semaphore because of the absence of free message connections (209) in the corresponding segement SP, two cases present themselves (210)

If it is a question of a notification message of intermediate, termination or attention type (211) the message is extracted from the queue Q/MS/EVQ and placed on a semaphore with free connections $(G_iD_i)$ or $(G_aD_a)$ of the segment SD originally associated with the message.

The message remains in the memorization zone of the corresponding LCE. The whole of these messages associated with the free connection semaphores forms a new queue Q/LC/FLS.

If it is a question of a channel exception notification message (212) the message is withdrawn from the queue Q/MS/EVQ and from the storage zone of the PCE (word 4). The message is abandoned by the requests manipulator and taken into account by the exceptions manipulator (213, 214).

If during a simulated operation V a system exception is creafed by anything else than an absence of free connections on the semaphore $G_xD_x$ (215) the message concerned with the simulated operation V is withdrawn from the queue Q/MS/EVQ but remains in LCE or PCE (216). The message is taken in account by the exception manipulator (217).

The structure of the queue of free-connection semaphores Q/LC/FLS has not been illustrated. It is nearly identical with the queue Q/MS/EVQ with this exception that the connections of the queue head and queue tail are in word 2 of the local storage SP. If operations P make available any connections in the segments SD the corresponding messages are withdrawn from the queue Q/LC/FLS and placed on their semaphores $G_iD_i$ or $G_aD_a$ and withdrawn from the zones of LCE in which they were inscribed.

Figure 17:
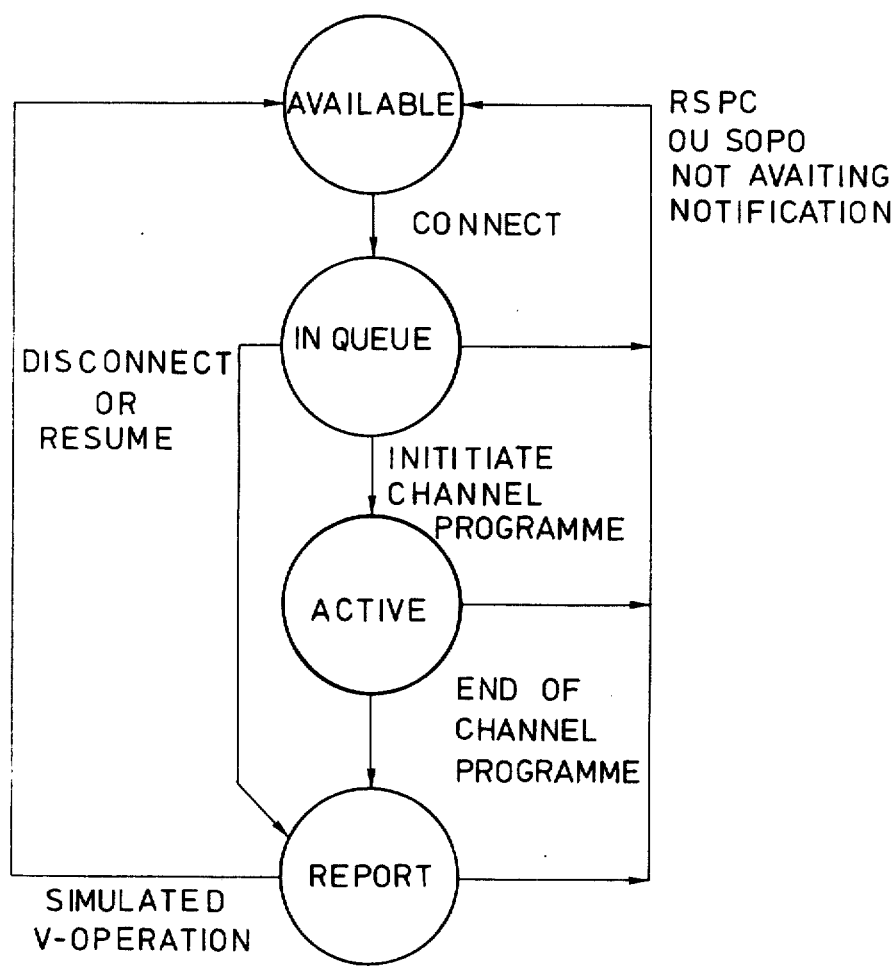
FIG. 17 is a diagram of the various states of the logical channels following IO instructions.

FIG. 17 is a diagram which represents the different states of the logical channels and passing from one state to another state.

Input and output operational channel states

During the execution of a channel programme the physical and logical channels are characterised by a certain number of states.

Physical channel states

At a given moment a physical channel may be in a nonoperational state or an operational state.

A physical channel returns to a non-operational state when the signal OPI or OPO (FIG. 9) of the interface PSI associated with the physical channel is set to zero because of verification of error or of faults.

A physical channel enters the operational state when the signal OPI and the signal OPO are brought to logical "1" by one of the following instructions of the central processor:
instruction for putting the physical channel in position (RSPC);
instruction for resetting in position (SOPO).

Logical channel states

At a given moment the state of a logical channel is one of the following:
available (AVL), placed in a queue (ENQ), active (ACT), awaiting notification of end (TNP).

In the available state (AVL) a logical channel has terminated the preceding channel programme and is free to commence another.

In a queue (Q/LC/INI) the logical channel initially in the available state has now been associated with a new channel programme by an instruction CONNECT I/O.

A logical channel is extracted from the queue in one of the following cases:
- the PCU commences execution of the associated channel programme and the logical channel passes over to the active state (ACT),
- an instruction DISCONNECT or RESUME is extracted before the PCU commences the associated channel programme. Upon the instruction DISCONNECT it enters the state of awaiting notification of end;
- when an instruction RSPC or SOPO is being executed and no emergency notification message is occupying the positions provided for this purpose in the logical channel entry, in this case the logical channel passes over to the available state (AVL).

Active state

A logical channel is in the active state during the execution of the channel programme which is associated with it.

A logical channel comes into the active state ACT when it is withdrawn from the queue Q/LC/INI of the corresponding physical channel and the PCU commences the associated channel programme. A logical channel leaves the active state ACT in one of the following cases:
- when the central processor CPU or an instruction DISCONNECT terminates the execution of the channel programme followed by a detailed state transfer if necessary. Then the logical channel comes into the position "awaiting notification of end" (TNP);
- when the signal OPO of the gate PSI falls to logical zero an instruction RSPC or SOPO is then executed and no emergency message is occupying the reserved zones in the corresponding logical channel entry LCE. The logical channel in that case returns to the available state AVC.

States of awaiting notification of end (TNP)

A logical channel is in this state when a notification of end message is occupying the zones which are reserved for it in the corresponding entry LCE, following upon complete execution of the appropriate channel programme. A logical channel may take up the state TNP in two ways;
- the logical channel being in the active state ACT, the PCU sends a state-of-termination service code sequence following the end of execution of the associated channel programme and if necessary transfers the detailed status;
- the logical channel is in the state ENQ (included in a queue) and in instruction DISCONNECT or RESUME is executed.

A logical channel abandons the state TNP and comes into the availability state (AVL) in one of the following cases:
- the contents of the zone LCE reserved for emergency notification messages are emptied by a simulated operation V or by an instruction FLCH for seizure of the logical channel;
- when an instruction RSPC or SOPO is executed whereas no emergency notification message is occupying the equivalent zones.

Emergency notification messages

During the execution of a channel programme the PCU and/or the IOC may emit emergency notification messages (EMN). These messages contain information on the subject of emergencies which are produced in the PCU and/or the IOC.

This information consists of summarised states of the PCU (PSB Nos. 1,2 and 3), summarised states of the IOC, parameters relative to the execution of channel progammes and the circumstances of the notification which is the object of the message. There are two zones in each LCE and one zone in each PCE which are employed for temporary memorizing of the messages between their emission by the IOC or the PCU and:
- either the execution of simulated operations V carried out later in order to place the messages of the semaphore defined by their name (GD);
- or the execution of the instruction IO "extraction of the logical channel (FLCH)" which is introduced in order to free the zones in question.

There are 3 categories of input and output emergencies.

1 — Emergencies relative to the execution of channel programmes and synchronized with this execution. It is a question of:
- intermediate emergencies which are relative to the execution of channel command entries CCE the indicators (flags) of which are brought to the logical level 1;
- termination emergencies.

The end of a channel programme under normal conditions gives a normal termination. The end of the execution of a programme before its normal stop because of an abnormal condition gives rise to an abnormal termination.

Termination emergency messages are emitted by the PCU for normal terminations and by the PCU or the IOC for abnormal terminations.

All these messages are stored in the same zones of the corresponding LCE (words 8 to 11, FIG. 18). The simulated operations V put them in a queue on semaphores the names $G_iD_i$ of which are contained in the heads of the associated channel programmes.

2 — "Attention" emergencies.

Emergencies which are associated with the PCU but without direct relationship with the execution of channel programmes and which are not synchronized with these executions. They are known under the name of "attention emergencies".

The corresponding messages EMN are emitted by the PCU only. They are always memorized in the same zones of the corresponding LCE (words C to F, that is to say, 13 to 15 in FIG. 18).

The simulated operations V place them on a single semaphore ($G_a$, $D_a$) which is inscribed in a summarized field of the corresponding LCE by the instruction "load the logical channel" (LLCH).

3 — Channel exceptions

These are emergencies which imply a change in the operational conditions of the logical channels or the IOC. These emergencies are not synchronized with the execution of the channel programmes. The corresponding messages are always emitted by the IOC and inscribed in the same zones of the physical channel entry (words 4 to 7).

A simulated operation V places them in a queue on a single semaphore the name of which ($G_xD_x$) is inscribed in the exception cell of the system base (address in the central memory BAR + 2C).

There is another means by which external emergencies may be put into communication with processes of the central processor. When this communication is necessary a request is made through the circuits and the microprogrammes of the data processing machine by means of a mechanism called the "emergencies interrogation system". This application is examined between the processing of instructions of the active process which is commanding the central processor and the result is a simulated operation V which communicates the information concerning the external emergency to this active process. These external emergencies which are processed between instructions are not connected directly to the active process which is commanding the central processor. These emergencies are especially input/output interruptions or certain exception conditions.

The emergencies interrogation system enables communications concerning input/output interruptions. By input/output interruption must be understood any communication resulting from the input/output sub-assembly. That includes the communications proceeding from the input/output controller (IOC) and all the peripheral members.

The input/output sub-assembly commands the asynchronous input/output operations and ensures a high degree of overlapping with the executions of the central processor. The input/output sub-assembly therefore contains the assembly of all the means which are necessary to the transfer of information between the main memory and the central processor as well as with all the peripheral apparatus which are provided in a peripheral sub-assembly.

Because the input/output sub-assembly IOC and the data processing sub-assembly CPU function independently during the execution of a channel programme a number of emergencies may be produced which must be communicated to the central processor. Since these emergencies may present themselves during or at the end of the execution of the channel programme the latter is interrupted and the input/output sub-assembly provides an emergency notification message which contains the number LC corresponding with the channel programme.

These input/output notification messages can identify the following emergencies: first of all, those of the emergencies which are connected with the execution of the channel programme and which are called below "intermediate or termination emergencies"; secondly, those of the emergencies which are associated with a specific peripheral member but which are not directly connected with the execution of the channel programme, which are called below "attention emergencies"; thirdly, those of the emergencies which imply a change in the operational conditions of certain input-/output circuits and which are called below "physical channel exceptions" or "input/output mal-operation exceptions".

Notification of input/output emergency messages is made in the following fashion to a process in the central processor. When an input/output message is recognised a mechanism called the "emergency interrogation system" is urged to execute a pseudo-process. This mechanism introduces a simulated operation V over a message semaphore, enabling the message to be transmitted to a process in the central processor. The input/output interruptions may therefore be considered as processes in the same sense as the processes in the central processor. That is to say, they communicate with the processes of the central processor by means of message semaphores and simulated synchronization originals. In addition, the simulated operation V transfers the message on behalf of the logical channel, exactly as an instruction V transfers the message on behalf of the process to the command of the central processor. For the input/output interruption the input/output sub-assembly delivers a signal which positions a memorizing element which may be, for example, a certain bit in a register position indicating that a message has been produced by an input/output emergency. This special signal is recognized by the central processor as indicating that an emergencies notification message is waiting to be put in a queue on a semaphore. This element which has been positioned will be called below the "interface storage element". When this interface element is in the state "1" the central processor is aware that a simulated operation V must be executed. At the end of the instruction under way, the emergency interrogation system illustrated by the programme is introduced by the central processor.

The emergency interrogation system consists of a physical mechanism intended to execute a group of operations just as the programme shows it. As is well known, this system may be put into operation by circuits or microprogrammes.

The emergency interrogation system is introduced by the central processor at the end of the execution of the instruction under way by the active process.

Figure 19:
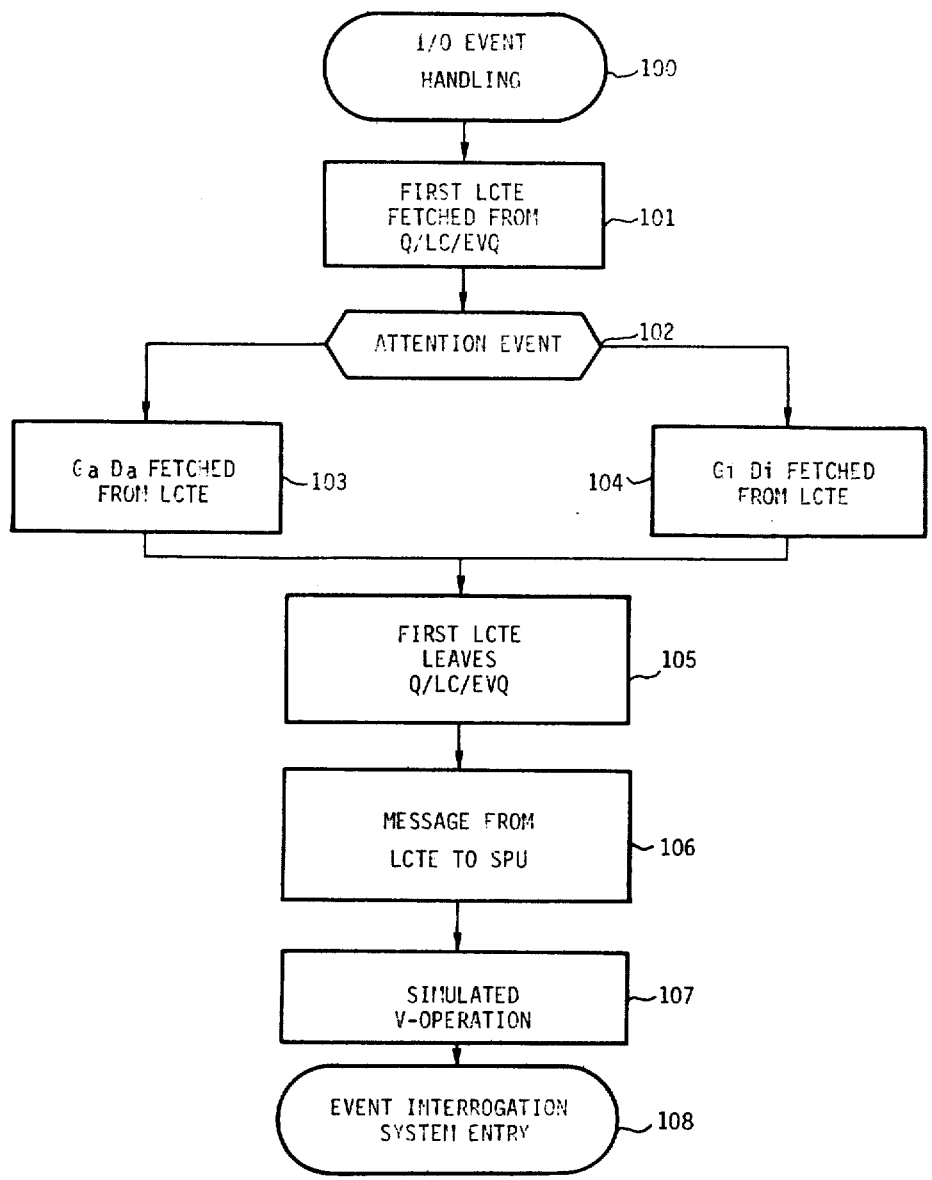
FIG. 19 is a program for notification of emergencies.

The programme represented in FIG. 19 shows that the input/output emergency processing system 100 is introduced when the emergency interrogation system detects the presence of an input/output emergency message in waiting. That may be indicated by the interface rocker circuit in the state "1" which in turn has placed an entry in a logical channels queue for an emergency, that is to say, Q/LC/EVQ represented in FIG. 16. These emergency messages must be placed in a queue on a message semaphore placed in the main memory of the central processor CPU. Before describing the functions fulfilled by the input/output emergencies processing system 100, the tables employed by the input/output controller IOC and which refer to the simulated operation V will be described in relation to FIG. 18.

When emergency notification messages have been produced by the IOC they are memorized in an appropriate logical channel table (LCT) comprising a number of logical channel table entries (LCTE) one of which is represented in FIG. 18. Every LCTE contains an emergency notification message which must be communicated to a process in the central processor by a simulated operation V. Each LCTE may contain two articles in the emergency notifications queue Q/LC/EVQ (FIG. 16). There is one single queue Q/LC/EVQ for all the logical channels of the IOC. If at least one message has been submitted the queue is formed and a signal passing one interface storage element over to the state "1" and identifying the appearance of an input/output emergency is emitted. If the queue is empty no signal is present and the storage element is placed in the logical state "0". If the interface rocker circuit is in the logical state "1" the emergencies interrogation system enables as many simulated operations V to be executed as is necessary to empty the queue Q/LC/EVQ, after which the interface rocker circuit is brought back to the logical state "0".

The messages transmitted by the input/output subassembly towards the LCTE are arranged in the queue Q/LC/EVQ in the order of their arrival, that is to say, according to the order FIFO (first in first out). Every simulated operation V fulfils a number of functions on the message placed in the queue. First of all it sends out the initial emergencies notification message from the queue Q/LC/EVQ. Secondly the simulated operation V tries to put this message into a queue on the associated semaphore given by the semaphore system name, that is to say, $G_i D_i$ for the intermediate or termination messages and $G_a D_a$ for the attention messages, or it tries to emit the message towards a process in waiting, designated by this semaphore. Thirdly, if the message can be placed in a queue on the semaphore or emitted over a process in waiting it is extracted from the queue Q/LC/EVQ and from the appropriate storage zone of the corresponding LCTE. Fourthly, if the message cannot be put in a queue on the appropriate semaphore because of the lack of a free message connection in the corresponding segment SD it is extracted from the queue Q/LC/EVQ and connected to the free connection semaphore of the segment SD corresponding with the semaphore $(G_i, D_i)$ or $(G_a, D_a)$ initially associated with the message. The message remains in the storage zone of the LCTE but the message connections are changed, that is to say, those of the LCTE associated with the free message connection semaphores are placed in a new queue Q/LC/FLS, that is to say, the logical channels queue on the free connections semaphore. The organisation of the two queues Q/LC/EVQ and Q/LC/FLS will be more easily understood by looking at the description of FIG. 16.

Figure 14:
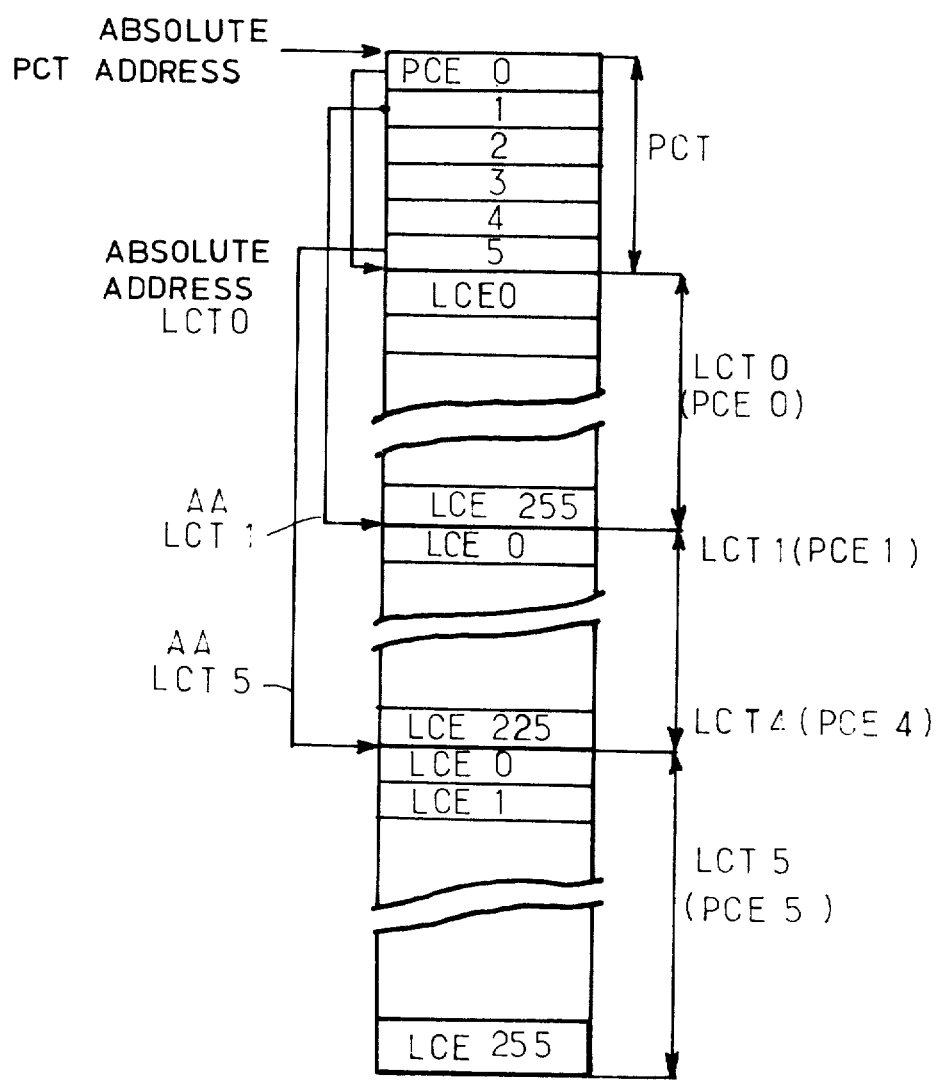
FIG. 14 represents the organisation of the physical channel table PCT and the logical channel tables LCT in the central memory.
Figure 14:
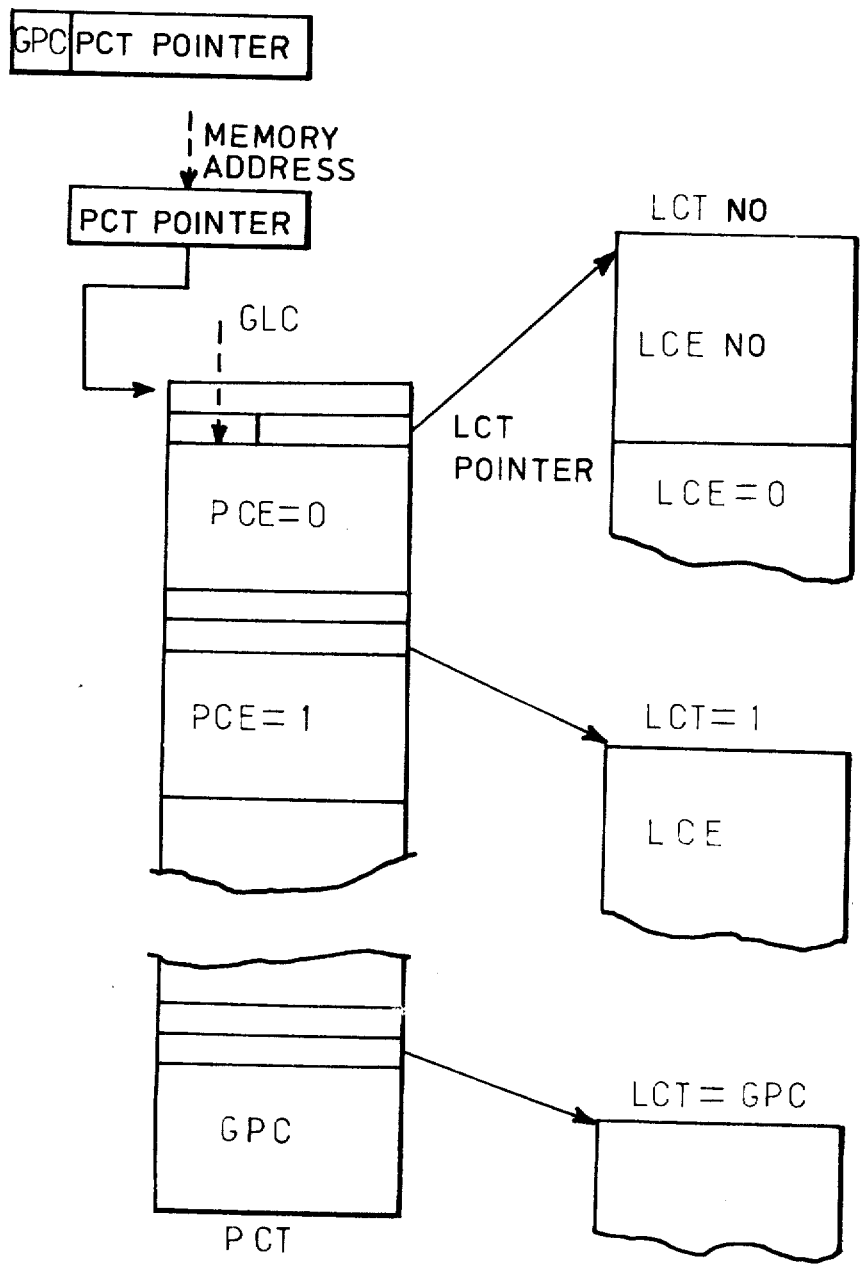

The IOC employs specific tables one of which corresponds with the various logical channels which establish a path of communication with the main memory. The input/output tables are located after the absolute address O but above the base address register (BAR). The LCTE represented in FIG. 16 is an entry for logical channels tables (LCT) as represented in FIG. 14.

Every logical channel table entry contains 16 words and it is employed to store information concerning the logical channel in addition to information which identifies the channel programme, the intermediate or emergency termination message and the attention messages. Only those of the fields of the LCTE concerned with the invention will be described below. The information which depends upon the programme is stored in the word number 1 and it comprises the state LC in the first multiplet and the attention semaphore name $G_a$, $D_a$ in the octets 1 to 3 of word number 1.

The intermediate or emergency termination message to be communicated is represented in the words 8 to 11. More especially the two first octets of the word 8 are the next connection indicator (NL) which identifies the queue in which lies the logical channel table entry. As has been described above, that may be the emergencies notification queue Q/LC/EVQ which appears when a message is initially transferred to the table or a free connections semaphores queue Q/LC/FLS which results from the impossibility of storing the message on the appropriate semaphore. The octet 2 of the word 8 defines the type of emergency which corresponds with a connection for the input/output operations. The connection field identifies the manner in which the input/output operation must be terminated and it may likewise contain information concerning a normal termination or an abnormal termination. In the fourth octet of the word 8 the first half of the multiplet is the priority of the message which corresponds with the priority of the channel programme described in the input/output operation. When this message is delivered into a message semaphore the queue of which is determined by priority, the field identifies the position of the message in the queue Q/M/S. The following half-multiplet is the type of message which identifies the fact that this message results from an input/output operation. The word 9 of the entry LCTE contains specific information which identifies the logical channel number (LC) and other information which is not concerned with the invention. The word 10 contains the channel command entry indicator CCE which has produced the intermediate or termination emergencies notification message. The word 11 may contain the state of the input/output device and of the input/output controller.

The words 8 to 11 constitute the message which must be transferred by the simulated operation V to a system address semaphore $G_i$, $D_i$. The words 12 to 15 constitute an attention message which is delivered to a semaphore having a system address $G_a$, $D_a$ identified in the word 1 of the table LCTE.

The first half-word of the attention message contains a following connection field which identifies its position in the LCTE and whether it is a question of a queue Q/LC/EVQ or Q/LC/FLS. The reason field, that is to say, the octet 3 of the word 12, contains a predetermined termination message represented by the code 10001101. The field identifies this semaphore message as a message of attention type. The priority field which is constituted by the first four bits of the fourth octet is positioned on a code 1111 which indicates the highest priority. The type of message is the same as for the intermediate or termination message because it indicates an input/output message. In the word 13 the first two multiplets are the same as in the messages described previously. But the last two multiplets identify the name of the device providing the attention message. Because an attention message described an emergency associated with a specific peripheral member but is not returned during the execution of the channel programme the residual counting fields and the address LCTE under way, supplied by the intermediate or termination emergency are not necessary. But the name of the member is necessary and the word 13 identifies it. The word 15 is identical with the word 11 described above. For attention messages all the information necessary is placed in only three words (the words 12, 13 and 15). The word 14 is therefore employed for storing the semaphore associated with the intermediate or termination emergency which is therefore found in the last three multiplets.

Every entry LCTE so described forms initially one or two objects in the emergency notification queue Q/LC/EVQ, that is to say, attention and/or termination or intermediate messages. Every entry represents the appearance of input/output emergencies which necessitate a communication with a process in the central processor. This communication may be ensured by the words 8 to 11 or the words 12 to 15 depending on the type of emergency to be reported. For an intermediate or termination message the simulated operation V is carried out over the semaphore $G_i$, $D_i$. For an attention message the simulated operation V is carried out over the semaphore $G_a$, $D_a$. The system name $G_i$, $D_i$ therefore identifies the semaphore over which all the messages connected to the channel programme must be delivered. The system name $G_a$, $D_a$ identifies the semaphore over which all the messages connected with a specific peripheral member must be delivered.

The queue Q/LC/EVQ has been described previously and it contains all the input/output messages during the execution of the previous instruction. The queue Q/LC/FLS is formed by the emergency interrogation system during the execution of a simulated operation V on behalf of the logical channel LC if there is not a process waiting on the appropriate semaphore and if there is not a free message connection in the semaphore FLS of the segment SD containing the appropriate semaphore. These connection fields are provided in the word 8 or in the word 12 of a LCTE and they identify the relative position of the logical channel table entry from the head indicator supplied by the predetermined positions 2E and 2F of the working memory. When the head indicator does not specify any next connection field, that is to say, its queue head is nil, that indicates that there is no entry into the queue. These queues Q/LC/EVQ and Q/LC/FLS are analogous to the message queues on Q/M/S and to the process connections queues Q/PL/PLS. But these queues differ in that the queue Q/LC/FLS contains those of the messages proceeding from the queue Q/LC/EVQ which cannot be put into a queue on their associated semaphores ($G_i$, $D_i$) or ($G_a$, $D_a$) because of a lack of free connections in the corresponding segments SD. That will appear in greater detail in the programme represented in FIG. 19.

In the programme 19 the first table entry LCTE is extracted from the queue Q/LC/EVQ at the phase 101. There is an entry in the position 2F of the working storage SPU which identifies the head of the queue Q/LC/EVQ. This entry is therefore an indicator of the first entry LCTE into the queue. This absolute address is extracted from the position 2E and its address is employed for gaining access to the first logical channel table entry. The indicator has been placed in the working storage when the input/output asynchronous subassembly has placed a message in the queue.

At the phase 102 the question is put of knowing whether it is a question of an attention emergency. If this is the case, at the phase 103 the address $G_a$, $D_a$ of the semaphore towards which the message is being directed is extracted from LCTE. If it is not an attention message, at the phase 104 the name $G_i$, $D_i$ of the semaphore towards which the message is being directed is extracted from the word 14 of LCTE.

At the phase 105 the first LCTE of the queue Q/LC/EVQ is taken out of the queue by changing the working storage, position in order to indicate a new head of the table LCTE and the next connection field of LCTE is extracted. The entry of LCTE has therefore been removed and its message must be placed on the message semaphore specified by the system name GD. At the phase 106 the message is placed in the positions WC4 to WC7 of the working storage. If it is a question of an intermediate message the words 8 to 11 are transferred into these positions, whilst if it is a question of an attention message it is the words 12 to 15 which are placed there.

At the phase 107 the message is transferred to the appropriate semaphore specified by the system name by means of a simulated operation V. At the end of the operation V the emergencies interrogation system is introduced again and the next entry LCTE if there is one is transferred to it.

The programme 19 is therefore a summary of the operations executed on an emergencies notification message when a communication with a process of the central processor is necessary.

It must be remembered that an instruction V is an emission operation which enables a message to be transferred to an intermediate point called a semaphore. The semaphore stores the data until a process is ready to remove them. Previously the instruction V has been executed by the process which commands the central processing unit. A simulated operation V is almost identical with the instruction V in that it emits information towards another process or towards a group of processes in the central processor. It differs from the instruction V in that the process which commands the central processor is a pseudo-process, that is to say, the emergencies interrogation system or the central exceptions mechanism executes the instruction V. The emergencies interrogation system is a portion of the block of firmware called the request manipulator or requests processing stage (request handler); this portion takes care of all the emergencies which are produced; similarly the exceptions processing mechanism (exception handler) takes care of all the exceptions.

The major special features of the simulated operation V introduced by the emergencies interrogation system are:

1. Bringing to light of the state of the logical channel after successful passing of the message, contrary to the bringing to light of the state of the process which has been executed by the process at the command of the central processor;
2. Putting of the logical channel into a queue on Q/LC/FLS when no process has been found waiting on the appropriate semaphore;
3. Control of the field G of the free connections semaphore in the segment SD in question when the logical channel counting field (CCT) is less than 0.

In addition, for the input/output emergency two supplementary differences have been provided. The first difference is the contents of the message provided and transferred by the simulated operation V.

The contents of the message for the input/output interruption has been described in respect of FIG. 18, during the course of the description of the table LCTE. Secondly, the address of the semaphore may have two names, that is to say, a local name SEG, SRA and a system name G, D. It must be remembered that for the command process of the central processor the name SEG, SRA has been employed for identifying the semaphore. Just as has been indicated for the intermediate, termination and attention messages, a system name GD is provided.

The system name of a semaphore is the address GD of the semaphore in the corresponding segment SD.

Messages addressed to the semaphores $G_i D_i$ and $G_a D_a$

During the execution of a channel programme various intermediate emergencies notification messages PEN and an end message TEN may be emitted.

However, there is only one zone in the associated logical channel entry LCE enabling these messages (words 8 to B) to be inscribed temporarily, 16.

A similar situation exists for the attention emergencies notification messages (AEN). There is only one storage zone for these messages in the LCE (words C to F). One message may be occupying a zone whereas a following message is presented to the same zone:

a. If this message has been emitted by the PCU, the IOC is going to reply with an instruction STACK in order to put the message in a stack and indicate in the logical channel entry LCE the presence of a stack. Later on, when the original message is withdrawn from the entry LCE the stack condition is detected. That causes the emission by the IOC of an instruction UNSTACK sent to the PCU which transmits the message contained in the stack.

b. If this message has been emitted by the IOC the previous message is obliterated and lost. The only measure taken is to indicate in the new message that the previous one has been lost.

MULTIPLEXING OF THE PHYSICAL CHANNELS

Six physical channels may, for example, be connected to the IOC. They are numbered from 0 to 5. Different channel programmes may be executed simultaneously over different physical channels. The organisation of this simultaneity is accomplished by the IOC and the microprogrammes which are associated with it. The IOC distinguishes two types of processing of the information:

processing of the service codes;
processing of the data or detailed states transfers.
For each type there is a high and low priority level.

| Processing | Priority level | Level number |
|---|---|---|
| Data or state transfer | High | 0 |
| Service codes | High | 1 |
| Data or state transfer | Low | 2 |
| Service codes | Low | 3 |

All these types of processing have a higher priority than operations of the central processor for which the priority level is 4.

If at a given moment different physical channels ask for processing at different priority levels a priority device picks the job of highest priority and leaves the others waiting.

If in the same way different channels ask for processing but at the same priority level the priority system of the IOC picks the physical channel of lowest number and leaves the others waiting.

If at a given moment a processing for a physical channel for the CPU arrives and if the priority system of the IOC picks another job of higher priority an interruption is produced which interrupts the processing of the job in course of execution and substitutes for it the new job. The interrupted job resumes when the new job is finished. The jobs are thus in succession interrupted and resumed in their order of priority when the job of highest priority has been completed.

The firmware IOC consists of a certain number of microprogrammes blocks corresponding with different processing priority levels performed by the IOC.

The microprogramme interruptions due to change in the jobs performed by the IOC are the interruptions IOC.

Figure 21:
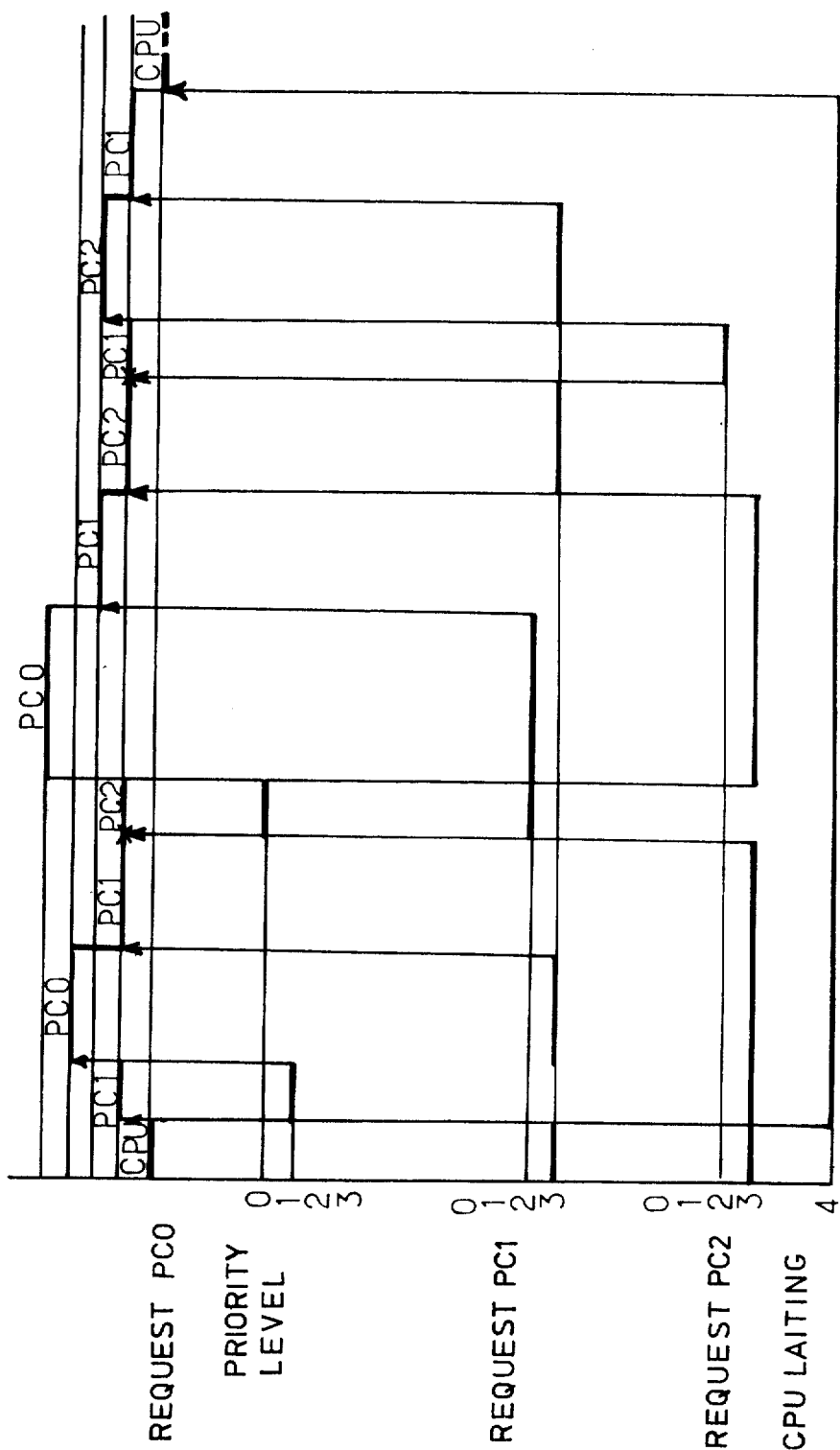
FIG. 21 is a diagram of the development of priority interruptions.

FIG. 21 represents the execution of the processing of operations on the three physical channels PC0, PC1 and PC2.

Time is entered in abscissae and the passing into execution of a channel programme is represented by a thick line. In this Figure the central processor is carrying out during a first period a process at priority level 4. Then the physical channel PC1 has an input/output to be carried out at level 3 (service codes transfer at low speed). The CPU is interrupted and the operations are carried out over the PC1 until there appears a request for service code transfer at level 1 (high speed) emitted by PC0. The operation under way over PC1 is interrupted until the operation over PC0 is terminated. Then the processor terminates the operation PC1 of level 3 and commences an operation over PC2 likewise of level 3 which is interrupted by an operation over PC0 of level 0 (data transfer at high speed) etc... The input/output operations are pursued until there is no longer any information to be transmitted over the channels. The central processor then resumes its processing at level 4.

The priority level is defined in the peripherals controller PCU by a code. In a service codes sequence sent by the PCU towards the IOC the first octet is always the service code. One bit of this service code (for example, the last) indicates the priority level. If it is at logical 1 it is a question of high priority and if it is at logical zero, of low priority.

If the service code sequence starts a data or detailed state transfer one or two other bits of the service code give the priority level.

The service codes in question are:

start of a data transfer } bit 4
start of a detailed state transfer
displacement of the channel programme pointers — bits 4 and 5.

The input/output controller which has just been described commands the transfers of data and of service codes between the main memory and at least one peripheral control unit. The new characteristics of its architecture form the object of another Patent Application filed this day for: "A device for command of data transfers between the central memory and the peripheral units of an information system" by the Applicant.

The controller which is the object of the present Application has the advantage of reducing the times of information transfers to a minimum by processing the emergencies which are produced, as pseudo-processes. These may be informed at any instant of the appearance of synchronous or asynchronous emergencies by the sending of messages placed on semaphores.

Of course the present invention is in no way limited to the embodiment which has just been described and numerous variants which will become apparent to those skilled in the art may be introduced without thereby departing from the scope of the invention.

GLOSSARY

BA: Branching argument
CCE: Channel command entry
CCC: Common channel-command circuit
CCWO: First word of a CCE
CCWI: Second word of a CCE
CHU: Channel head
CMP: Command printer CNCT: To connect an input/output instruction.
CP: Channel programme.
CPAA: Absolute address of the channel programme
CPU: Central processor
CPW: Signal PSI indicating a channel programme waiting.
CWP: Word of command pointer.
C(CMP): CCE pointed to by CMP
C(CWP): CCE pointed to by CWP
DC: Data chaining
DC flag: Data change indicator flag
DCA: Data chaining table
DCNCT: Disconnection instruction
DTPCH: Diagnostic instruction
DSB: Detailed state octet
EN: Notification of emergency
FIFO: First in first out
FLCH: Taking off of a logical channel instruction
$G_aD_a$: Name of the semaphore over which an "attention" message is sent
$G_iD_i$: Name of the semaphore over which an "intermediate" message or an end message is sent.
HG: Hardware gate
IDS: Service code for start of detailed state
IDI: Service code for start of data transfer
IEN: Service code for start of notification of emergencies
IIF: Service code for start of an I/O instruction
INP: Service code for start of a new programme
IOC: Input and output controller
Instruction IOC: Instruction sent by the IOC towards a PCU
State IOC: Information octet sent by the software
IOEN: Modification of an emergency generated by the IOC
Instruction I/O: Software instruction for input/output
ISO: Illegal-sequence output signal PSI
IT: End start service code
LC(N): Logical channel (number)
NPA: Waiting for an attention notification
NPI: Waiting for an intermediate or end notification
OPI: Signal PSI of passing over to the operational state
PC: Physical channel
PCU: Peripherals controller
PSB: State octet for a peripheral
PSI: Peripheral sub-system interface
Q/LC/EVQ: Queue of notification messages (for example: attention, intermediate, end or physical channel acceptance)
Q/LC/INW: Queue of instructions IOC relative to a signal INW from the PSI
Q/LC/PC: Queue of logical channels awaiting their initialization (relative to the signal CPW)
REPCH: Preparation of a physical channel instruction IO
RESUME: Summary instruction IO or IOC
RSO: Preparation of the output signal from the PSI
SADN: Software name assigned to the device
SCR: Service codes register
SEVF: Operation V software instruction
SK: Flag SKIP in a CCE
SOPO: Position the instruction P/O OPO
STACK: Stack instruction IOC
STI: Input synchronization signal PSI
STO: Output synchronization signal PSI
SVC: Service code
TMI: Termination start signal PSI
TMU: Termination end signal PSI
TS or T/S: Test of the CCE
UCB: Unconditional branching of CCE

We claim:

1. An input/output control system for an information processing system, comprising a main memory, a central processing unit having an input, a peripheral controller, and a plurality of peripheral units, each coupled to said central processing unit by said peripheral controller, said input/output control system comprising:

a. a plurality of physical channels disposed between said peripheral controller and said input to said central processing unit;

b. a plurality of logical channels for communicating information with said central processing unit, each of said logical channels being uniquely associated with one of said peripheral units and identified uniquely by a channel number;

c. said main memory comprising means for storing a first table including a number of physical channel entries containing in formation relative to said plurality of physical channels and a second table including a number of logical channel entries each containing information relative to one of said plurality of peripheral units, the number of logic channel entries of said second table enabling access to the information contained therein, each physical channel entry corresponding to one of said logical channel tables; and d. means for storing a channel control program comprising command words for data transfer, said input/output control system executing the channel control programs to selectively transfer data between said main memory and peripheral controller, by connecting said input/output control system to a logical channel entry and placing the identifying number of its logical channel in said means for storing to await execution.

2. The input/output control system for controlling the data transfer between said central processing unit and peripheral controller according to claim 1, further comprising means for storing the logical channel number allocated to the data transfers between said input/output control system and a peripheral unit, and means for storing the channel number used in the data transfers between said input/output control system and said peripheral controller.

3. The input/output control system as claimed in claim 2, wherein said means for storing the channel number includes means for queuing the logical channel number by level of priority.

4. The input/output control system as claimed in claim 3, further comprising means for storing a service code sent by said peripheral controller and said input/output control system responsive to the service code for executing the first logical channel number.

5. The input/output control system as claimed in claim 4, further comprising means for storing two channel pointers, one of which points at the first word of command of the first command entry and the second points to the second word of command or to the first word of command of the next control entry, and means for displacing the pointers to execute the corresponding channel program.

6. The input/output control system as claimed in claim 1, further comprising means for storing emergency messages, means for placing the emergency messages in a queue in order of their arrival, means for reading from said queue in the order first in, first out, and means for forming selectively such messages as one of a plurality of semaphores in order to be in relationship with a process waiting for the corresponding semaphore.

7. The input/output control system as claimed in claim 6, further comprising means for placing the messages which cannot be formed as one of said semaphores into a second queue.

* * * * *